US009349218B2

(12) United States Patent
Keating et al.

(10) Patent No.: US 9,349,218 B2
(45) Date of Patent: May 24, 2016

(54) METHOD AND APPARATUS FOR CONTROLLING AUGMENTED REALITY

(71) Applicant: QUALCOMM Incorporated, San Diego, CA (US)

(72) Inventors: Virginia Walker Keating, San Diego, CA (US); Michael Gervautz, Vienna (AT); Per O. Nielsen, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/815,820

(22) Filed: Mar. 15, 2013

(65) Prior Publication Data

US 2014/0028712 A1 Jan. 30, 2014

Related U.S. Application Data

(60) Provisional application No. 61/676,246, filed on Jul. 26, 2012, provisional application No. 61/676,249, filed on Jul. 26, 2012, provisional application No. 61/676,278, filed on Jul. 26, 2012, provisional application No. 61/676,255, filed on Jul. 26, 2012, provisional application No. 61/676,274, filed on Jul. 26, 2012.

(51) Int. Cl.
G09G 5/00 (2006.01)
G06T 19/00 (2011.01)
(Continued)

(52) U.S. Cl.
CPC .............. *G06T 19/006* (2013.01); *A63F 13/00* (2013.01); *G06F 3/005* (2013.01); *G06F 3/01* (2013.01); *G06F 3/011* (2013.01); *G06F 3/0304* (2013.01); *G06K 9/00201* (2013.01); *G06K 9/00671* (2013.01); *G06K 9/4671* (2013.01); *G06T 7/2033* (2013.01); *H04N 7/185* (2013.01); *H04N 21/4126* (2013.01); *H04N 21/42208* (2013.01);
(Continued)

(58) Field of Classification Search
None
See application file for complete search history.

(56) References Cited

U.S. PATENT DOCUMENTS 5,588,139 A 12/1996 Lanier et al.
6,175,954 B1 1/2001 Nelson et al.
(Continued)

FOREIGN PATENT DOCUMENTS

CN 102402842 A 4/2012
EP 2105179 A1 9/2009
(Continued)

OTHER PUBLICATIONS

International Search Report and Written Opinion—PCT/US2013/048677—ISA/EPO—Sep. 20, 2013.
(Continued)

*Primary Examiner* — Xiao Wu
*Assistant Examiner* — Mohammad H Akhavannik
(74) *Attorney, Agent, or Firm* — Silicon Valley Patent Group LLP

(57) ABSTRACT

Method and apparatus for controlling an augmented reality interface are disclosed. In one embodiment, a method for use with an augmented reality enabled device (ARD) comprises receiving image data for tracking a plurality of objects, identifying an object to be selected from the plurality of objects, determining whether the object has been selected based at least in part on a set of selection criteria, and causing an augmentation to be rendered with the object if it is determined that the object has been selected.

38 Claims, 15 Drawing Sheets

(51) Int. Cl.

| | | |
|---|---|---|
| H04N 7/18 | (2006.01) | |
| H04N 21/41 | (2011.01) | |
| H04N 21/422 | (2011.01) | |
| H04N 21/482 | (2011.01) | |
| H04N 21/485 | (2011.01) | |
| G06T 7/20 | (2006.01) | |
| G06F 3/00 | (2006.01) | |
| G06F 3/01 | (2006.01) | |
| G06F 3/03 | (2006.01) | |
| G06K 9/00 | (2006.01) | |
| G06K 9/46 | (2006.01) | |
| A63F 13/00 | (2014.01) | |

(52) U.S. Cl.
CPC ....... *H04N 21/42224* (2013.01); *H04N 21/482* (2013.01); *H04N 21/4852* (2013.01); *A63F 2300/105* (2013.01); *A63F 2300/1075* (2013.01); *A63F 2300/1087* (2013.01); *A63F 2300/405* (2013.01); *A63F 2300/69* (2013.01); *A63F 2300/8082* (2013.01)

(56) References Cited

U.S. PATENT DOCUMENTS

| | | | |
|---|---|---|---|
| 6,616,454 | B2 | 9/2003 | Ebersole et al. |
| 7,050,078 | B2 | 5/2006 | Dempski |
| 7,536,030 | B2 | 5/2009 | Wang et al. |
| 7,724,258 | B2 | 5/2010 | Ebert et al. |
| 7,768,534 | B2 | 8/2010 | Pentenrieder et al. |
| 7,774,044 | B2 | 8/2010 | Sauer et al. |
| 7,777,642 | B2 | 8/2010 | Kim et al. |
| 8,264,505 | B2 | 9/2012 | Bathiche et al. |
| 8,314,815 | B2 | 11/2012 | Navab et al. |
| 8,358,320 | B2 | 1/2013 | Zhou et al. |
| 8,928,796 | B2 | 1/2015 | Van Heugten et al. |
| 2004/0145594 | A1 | 7/2004 | Kobayashi et al. |
| 2004/0193413 | A1 | 9/2004 | Wilson et al. |
| 2006/0184003 | A1 | 8/2006 | Lewin et al. |
| 2007/0222746 | A1 | 9/2007 | LeVine |
| 2008/0225041 | A1 | 9/2008 | El Dokor et al. |
| 2010/0001998 | A1 | 1/2010 | Mandella et al. |
| 2010/0013860 | A1 | 1/2010 | Mandella et al. |
| 2010/0030578 | A1 | 2/2010 | Siddique et al. |
| 2010/0086218 | A1 | 4/2010 | Tateno |
| 2010/0150404 | A1 | 6/2010 | Marks et al. |
| 2011/0021180 | A1 | 1/2011 | Ray |
| 2011/0138416 | A1 | 6/2011 | Kang et al. |
| 2011/0164163 | A1 | 7/2011 | Bilbrey et al. |
| 2011/0187527 | A1 | 8/2011 | Goodwill et al. |
| 2011/0310227 | A1 | 12/2011 | Konertz et al. |
| 2011/0316845 | A1 | 12/2011 | Roberts et al. |
| 2012/0026192 | A1 | 2/2012 | Lim |
| 2012/0038549 | A1 | 2/2012 | Mandella et al. |
| 2012/0057032 | A1 | 3/2012 | Jang et al. |
| 2012/0075168 | A1 | 3/2012 | Osterhout et al. |
| 2012/0075343 | A1 | 3/2012 | Chen et al. |
| 2012/0075345 | A1 | 3/2012 | Lee et al. |
| 2012/0087580 | A1 | 4/2012 | Woo et al. |
| 2012/0113223 | A1 | 5/2012 | Hilliges et al. |
| 2012/0120070 | A1 | 5/2012 | Baillot |
| 2012/0128241 | A1 | 5/2012 | Jung |
| 2012/0146998 | A1 | 6/2012 | Kim et al. |
| 2012/0151347 | A1 | 6/2012 | McClements, IV |
| 2012/0188342 | A1 | 7/2012 | Gervautz et al. |
| 2012/0195460 | A1 | 8/2012 | Lawrence Ashok Inigo |
| 2012/0195461 | A1 | 8/2012 | Lawrence Ashok Inigo |
| 2012/0206485 | A1 | 8/2012 | Osterhout et al. |
| 2012/0242865 | A1 | 9/2012 | Vartanian et al. |
| 2012/0243732 | A1 | 9/2012 | Swaminathan et al. |
| 2012/0244907 | A1 | 9/2012 | Athsani et al. |
| 2012/0249528 | A1 | 10/2012 | Park et al. |
| 2013/0050432 | A1* | 2/2013 | Perez et al. ............ 348/47 |
| 2013/0063560 | A1 | 3/2013 | Roberts et al. |
| 2013/0215148 | A1 | 8/2013 | Antonyuk et al. |
| 2013/0305437 | A1 | 11/2013 | Weller et al. |
| 2013/0314303 | A1 | 11/2013 | Osterhout et al. |
| 2014/0014637 | A1 | 1/2014 | Hunt |
| 2014/0028713 | A1 | 1/2014 | Keating et al. |
| 2014/0028714 | A1 | 1/2014 | Keating et al. |
| 2014/0028850 | A1 | 1/2014 | Keating et al. |
| 2014/0063054 | A1 | 3/2014 | Osterhout et al. |
| 2014/0063055 | A1 | 3/2014 | Osterhout et al. |

FOREIGN PATENT DOCUMENTS

| | | |
|---|---|---|
| EP | 2111901 A2 | 10/2009 |
| EP | 2400464 A2 | 12/2011 |
| WO | 0229711 A2 | 4/2002 |
| WO | 2007106046 A2 | 9/2007 |
| WO | 2012009789 A2 | 1/2012 |
| WO | 2012039676 A1 | 3/2012 |

OTHER PUBLICATIONS

Antoniac P., "Augmented Reality based User Interface for Mobile Applications and Services," University of Oulu, 2005, pp. 1-181, URL http://herkules.oulu.fi/isbn9514276965/isbn9514276965.pdf.

Ballagas R., et al., "The smart phone: a ubiquitous input device," IEEE Pervasive Computing, Jan.-Mar. 2006, vol. 5 (1), pp. 70-77, URL: http://ieeexplore.ieee.org/stamp/stamp.jsp?tp=&arnumber=1593574&isnumber=33539.

Billinghurst M., et al., "Collaboration with Tangible Augmented Reality Interfaces," In Proceedings of the Ninth International Conference on Human-Computer Interaction 2001, pp. 1-5, http://citeseerx.ist.psu.edu/viewdoc/download;jsessionid=5FB35F83B0215975B018353CC9850A07?doi=10.1.1.98.766&rep=rep1&type=pdf.

Billinghurst M., et al., "Tangible Augmented Reality," In ACM SIGGRAPH Asia 2008 courses (SIGGRAPH Asia), ACM, New York, NY, USA, Article 7, 2008, 10 pages, URL: http://doi.acm.org/10.1145/1508044.1508051.

Boring S., "Touch projector: mobile interaction through video," In Proceedings of the 28th international conference on Human factors in computing systems (CHI), ACM, New York, NY, USA, 2010, pp. 2287-2296, URL: http://doi.acm.org/10.1145/1753326.1753671.

Chen L.H., et al., "A remote Chinese chess game using mobile phone augmented reality," In Proceedings of the 2008 International Conference on Advances in Computer Entertainment Technology (ACE), ACM, NewYork, NY, USA, 2008, pp. 284-287, URL: http://doi.acm.org/10.1145/1501750.1501817.

Chen R., et al., "An Empirical Study on Tangible Augmented Reality Learning Space for Design Skill Transfer," Tsinghua Science and Technology, vol. 13 (1), 2008, pp. 13-18, URL: http://www.sciencedirect.com/science?_ob=MImg&_imagekey=B7RKT-4TX6FMS-3-1&_cdi=25731&_user=4757105&_pii=S100-7021408701202&_origin=search&_coverDate=10%2F31%2F2008&_sk=999869999.8998&view=c&wchp=dGLzVtb-zSkzS&md5=cd34d81eaf65bbc2b21b95f0bc333323&ie=/sdarticle.pdf.

Choumane A., et al., "Buttonless clicking: Intuitive select and pick-release through gesture analysis," IEEE Virtual Reality Conference (VR), Mar. 20-24, 2010, pp. 67-70.

Ha T., "An empirical evaluation of virtual hand techniques for 3D object manipulation in a tangible augmented reality environment," IEEE Symposium on 3D User Interfaces (3DUI), Mar. 2010, pp. 91-98, 20-21, URL: http://www.ieeexplore.ieee.org/stamp/stamp.jsp?tp=&arnumber=5444713&isnumber=5444694.

Hachet M., et al., "3D Interaction With and From Handheld Computers," Proceedings of IEEE VR 2005 Workshops: New Directions in 3D User Interfaces, 2005, pp. 1-5, URL: http://iparla.labri.fr/publications/2005/HK05/hach.

Hansen et al "Mixed Interactions Spaces—a new interaction technique for mobile devices", Demonstrated: Tokyo, Japan, UbiComp Conference, 2005, pp. 1-2.

Henrysson A., et al., "Mobile phone based AR scene assembly," In Proceedings of the 4th international conference on Mobile and ubiq-

(56) References Cited

OTHER PUBLICATIONS uitous multimedia (MUM '05), ACM, New York, NY, USA, 2005, pp. 95-102, URL: http://doi.acm.org/10.1145/1149488.1149504.
Henrysson A., et al., "Virtual object manipulation using a mobile phone," In Proceedings of the 2005 international conference on Augmented tele-existence (ICAT), ACM, New York, NY, USA, 2005, pp. 164-171. http://doi.acm.org/10.1145/1152399.1152430.
Henze N., et al., "Mobile interaction with the real world," In Proceedings of the 10th international conference on Human computer interaction with mobile devices and services (MobileHCI), ACM, New York, NY, USA, 2008, pp. 563-565. http://doi.acm.org/10.1145/1409240.1409351.
Juan C., "Augmented Reality Interactive Storytelling Systems Using Tangible Cubes for Edutainment," In Proceedings of the 2008 Eighth International Conference on Advanced Learning Technologies (ICALT), IEEE Computer Society, Washington, DC, USA, 2008, pp. 233-235, http://dx.doi.org/10.1109/ICALT.2008.122.
Karayev S., "Virtual Zoom: Augmented Reality on a Mobile Device," University of Washington, Honors Thesis in Computer Science, 2009, pp. 1-18, URL: http://sergeykarayev.com/files/vz_thesis.pdf.
Katzakis N., et al., "Mobile Phones as 3-DOF Controllers: A Comparative Study," Eighth IEEE International Conference on Dependable, Autonomic and Secure Computing (DASC), Dec. 12-14, 2009, pp. 345-349, URL: http://www.ieeexplore.ieee.org/stamp/stamp.jsp?tp=arnumber=5380602&isnumber=5380134.
Kray C., "Swiss Army Knife meets Camera Phone: Tool Selection and Interaction using Visual Markers," Proceedings of Mobile Interactions with the Real World (MIRW), 2007, 4 Pages, URL: http://citeseer.ist.psu.edu/viewdoc/download?doi=10.1.1.136.4952&rep=rep1&type=pdf.
Lee, et al., "Markerless Inspection of Augmented Reality Objects Using Fingertip Tracking," International Symposium on Wearable Computer, Oct. 2007, 8 pp.
Lee, G.A. et al., "Occlusion based Interaction Methods for Tangible Augmented Reality Environments," Proceedings of the 2004 ACM SIGGRAPH International Conference on Virtual Reality Continuum and Its Applications in Industry (VRCAI '04), Jan. 1, 2004, pp. 419-426, XP55005457, 1 New York, New York, USA DOI: 10.1145/1044588.1044680. ISBN: 978-1-58-0113884-9.
Lee G.A., "Freeze-Set-Go interaction method for handheld mobile augmented reality environments," In Proceedings of the 16th ACM Symposium on Virtual Reality and Technology (VRST), ACM, New York, NY, USA, 2009, pp. 143-146, URL: http://doi.acm.org/10.1145/1643928.1643961.
Lee W., "Tarboard: Tangible augmented reality system for table-top game environment," In 2nd International Workshop on Pervasive Gaming Applications, vol. 5, 2005, 5 Pages, URL http://www.ipsi.fraunhofer.de/ambiente/pergames2005/papers_2005/PerGames2005_TARBoard_WLee.pdf.
Looser J., "An evaluation of virtual lenses for object selection in augmented reality," In Proceedings of the 5th international conference on Computer graphics and interactive techniques in Australia and Southeast Asia (GRAPHITE), ACM, New York, NY, USA, 2007, pp. 203-210. http://doi.acm.org/10.1145/1321261.1321297.
Oh S., et al., "CAMAR: Context-aware Mobile Augmented Reality in Smart Space," GIST U-VR Lab, 2009, pp. 48-51, URL: http://icserv.gist.ac.kr/mis/publications/data/2009/iwuvr-soh.pdf.
Pierce J.S., et al., "Image plane interaction techniques in 3D immersive environments," In Proceedings of the 1997 symposium on Interactive 3D graphics (I3D), ACM, New York, NY, USA, 1997, pp. 39-ff., URL: http://doi.acm.org/10.1145/253284.253303.
Reimann C., et al., "Computer Vision based Interaction Techniques for mobile Augmented Reality," pp. 1-13, URL http://citeseerx.ist.psu.edu/viewdoc/download?doi=10.1.1.101.2121&rep=rep1&type=pdf.
Reitmayr G., et al., "iOrb—Unifying Command and 3D Input for Mobile Augmented Reality," 2005, 4 Pages, URL: http://www.ims.tuwien.ac.at/publication_detail.php?ims_id=TR-188-2-2005-02.
Rohs M., "Which one is better?—information navigation techniques for spatially aware handheld displays," In Proceedings of the 8th International Conference on Multimodal Interfaces (ICMI), 2006, pp. 1-8, URL: http://citeseerx.ist.psu.edu/viewdoc/download?doi=10.1.1.128.3921&rep=rep1&type=pdf.
Sinclair P., et al., "Adapting Information Through Tangible Augmented Reality Interfaces," In UbiComp 2004, the Sixth International Confernce on Ubiquitous Computing, Sep. 2004, 2 Pages, URL: http://citeseerx.ist.psu.edu/viewdoc/download?doi=10.1.1.96.3820&rep=rep1&type=pdf.
Slay H., et al., "Tangible user interaction using augmented reality," Australian Computer Science Communications, vol. 24 (4), Jan. 2002, pp. 13-20, http://dx.doi.org/10.1145/563997.563988.
Ulbricht C., et al., "Tangible Augmented Reality for Computer Games," Proceeding (396) Visualization, Imaging, and Image Processing, 2003, 5 Pages, URL: http://www.cg.tuwien.ac.at/~cu/tangibleAR/viipPaper.pdf.
White S., et al., "Visual Hints for Tangible Gestures in Augmented Reality," In Proceedings of the 2007 6th IEEE and ACM International Symposium on Mixed and Augmented Reality (ISMAR), IEEE Computer Society, Washington, DC, USA, 2007, pp. 1-4. http://dx.doi.org/10.1109/ISMAR.2007.4538824.
White Sean et al., "Interaction and presentation techniques for shake menus in tangible augmented reality", 8th IEEE International Symposium on Mixed and Augmented Reality (ISMAR), Oct. 19, 2009, Piscataway, NJ, USA, IEEE, pp. 39-48, XP031568946, ISBN: 978-1-4244-5390-0.
Yan Q., "Tangible User Interfaces for Augmented Reality," National University of Singapore, 2003, 144 Pages, URL https://scholarbank.nus.edu.sg/bitstream/handle/10635/14133/ThesisV2.pdf?sequence=1.
Kurz, D., et al., "Handheld Augmented Reality involving gravity measurements," Munich Germany, vol. 36, No. 7, Nov. 2012, pp. 866-883.

\* cited by examiner

METHOD AND APPARATUS FOR CONTROLLING AUGMENTED REALITY

CROSS REFERENCE TO RELATED APPLICATIONS

This application claims the benefit of U.S. provisional application No. 61/676,246, "Interactions of Tangible and Augmented Reality Objects" filed Jul. 26, 2012; U.S. provisional application No. 61/676,249, "Maintaining Continuity of Augmentations" filed Jul. 26, 2012; U.S. provisional application No. 61/676,278, "Method and Apparatus for Controlling Augmented Reality" filed Jul. 26, 2012; U.S. provisional application No. 61/676,255, "Interactions of Tangible and Augmented Reality Objects" filed Jul. 26, 2012; and U.S. provisional application No. 61/676,274, "Tangible Items' Effect on Particle System Augmentation in Virtual Spaces" filed Jul. 26, 2012. The aforementioned United States applications are hereby incorporated by reference in their entirety.

FIELD

The present disclosure relates to the field of augmented reality. In particular, the present disclosure relates to methods and apparatuses for controlling an augmented reality.

BACKGROUND

Conventional augmented reality applications provide a live view of a real-world environment whose elements may be augmented by computer-generated sensory input such as video, sound, graphics or GPS data. With such applications, a view of reality may be modified by a computing device, and they can enhance a user's perception of reality and provide more information about the user's environment. For example, augmented contents may be applied in real-time and in semantic context with environmental elements, such as game statistics and summaries during a match. With the proliferation of mobile devices, such as smart phones, information about the surrounding real world of a user may be displayed on a mobile device with additional augmented contents, such as artificial information about the environment with virtual objects being overlaid on the real-world objects.

In conventional computing and gaming applications, a user may be able to select an item on a display by using at least one of the following user interface devices, such as mouse, a touch pad, a touch screen or a joystick. However, for conventional augmented reality applications, one of the problems is that both of the user's hands can be occupied. For example one hand may be used to hold an augmented reality enable device and the other hand may be used to handle a tangible object. Another problem with the conventional augmented reality applications is that accidental triggering of augmentation may occur, which can disrupt a play and frustrate the user. Therefore, there is a need for method, computer program product, and augmented reality enabled device that can improve the conventional augmented reality applications.

SUMMARY

The present disclosure relates to methods and apparatuses for controlling an augmented reality. According to an embodiment of the present disclosure, a method for use with an augmented reality enabled device (ARD) comprises receiving image data for tracking a plurality of objects, identifying an object to be selected from the plurality of objects, determining whether the object has been selected based at least in part on a set of selection criteria, and causing an augmentation to be rendered with the object if it is determined that the object has been selected.

According to another embodiment of the present disclosure, an ARD comprises a control unit including processing logic; the processing logic comprises logic configured to receiving image data for tracking a plurality of objects, logic configured to identify an object to be selected from the plurality of objects, logic configured to determine whether the object has been selected based at least in part on a set of selection criteria, and logic configured to cause an augmentation to be rendered with the object if it is determined that the object has been selected.

Note that the tracking comprises 3-dimensional tracking comprises logic configured to determine relative poses of the plurality of objects with respect to the ARD, and logic configured to update states of the plurality of objects using the relative poses of the plurality of objects with respect to the ARD, where the states of the plurality of objects include relational information of the plurality of objects. The logic configured to determine relative poses of the plurality of objects with respect to the ARD comprises logic configured to detect poses of the plurality of objects with respect to previously received image data of the plurality of objects. The relational information comprises at least one of: relationships among the plurality of objects in a game, relationships among the plurality of objects in a story, and/or relationships between the plurality of objects with respect to a background.

The logic configured to identify an object to be selected comprises logic configured to analyze the plurality of objects using the image data, and logic configured to identify the object being closest to a center of an image represented by the image data. The logic configured to identify an object to be selected further comprises logic configured to cause the plurality of objects in the image data to be rendered on a display of the ARD, and logic configured to identify the object that covers most of center pixels of the display of the ARD.

The logic configured to determine whether the object has been selected further comprises logic configured to measure relative velocity between the object and the ARD, and logic configured to measure amount of time the object is stationary with respect to the ARD. The logic configured to determine whether the object has been selected further comprises logic configured to receive an audio command, and logic configured to measure amplitude of the audio command. The set of selection criteria comprises at least one of: the object being in view of the ARD for a predetermined period of time, the object being in view of the ARD and a relative velocity between the object and the ARD being below a predetermined threshold, and the object being in view of the ARD and amplitude of an audio command exceeding a predetermined value. The logic configured to cause the augmentation to be rendered comprises logic configured to present interactions between the object and the ARD in a display of the ARD. The logic configured to identify comprises logic configured to determine that the object has been zoomed in on.

The logic configured to determine comprises logic configured to cause an indicator to be presented, where the indicator indicating that the object has been identified, and logic configured to determine whether the object is deselected in response to presentation of the indicator. The logic configured to determine whether the object is deselected comprises logic configured to determine that the object has been selected if a position of the object with respect to the ARD is maintained for a threshold amount of time after presentation of the indicator. The indicator comprises at least one of an icon, a vibration of the object on a display of the ARD, a vibration of the ARD when the object is centered on the display of the ARD, and a representation of an elapsed time.

The augmented reality enabled device further comprises logic configured to cause an image of a scene to be displayed on a display of the ARD, the scene including one or more objects, logic configured to cause the image to be augmented with an indicator identifying an object of to be selected from the plurality of objects, and logic configured to determine whether the object has been deselected subsequent to the image being augmented with the indicator.

According to yet another embodiment of the present disclosure, a computer program product comprises a non-transitory medium storing instructions for execution by one or more computer systems; the instructions comprises instructions for receiving image data for tracking a plurality of objects, instructions for identifying an object to be selected from the plurality of objects, instructions for determining whether the object has been selected based at least in part on a set of selection criteria, and instructions for causing an augmentation to be rendered with the object if it is determined that the object has been selected.

According to yet another embodiment of the present disclosure, an apparatus comprises means for receiving image data for tracking a plurality of objects, means for identifying an object to be selected from the plurality of objects, means for determining whether the object has been selected based at least in part on a set of selection criteria, and means for causing an augmentation to be rendered with the object if it is determined that the object has been selected.

According to further embodiments, techniques for providing voice and tangible user interfaces for augmented reality are provided. Various example implementations illustrated herein can be implemented on an Augmented Reality (AR) enabled device. The ARD can be a mobile phone, tablet computer, or other such devices that includes a processor for executing machine executable machine executable instructions, a camera for capturing images or video of a real-world environment, and a display for displaying an augmented reality view of the real-world environment. These techniques can be integrated in a wide variety of augmented reality applications to create a more satisfying and engaging user experience than conventional AR applications.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Embodiments of controlling an augmented reality interface are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
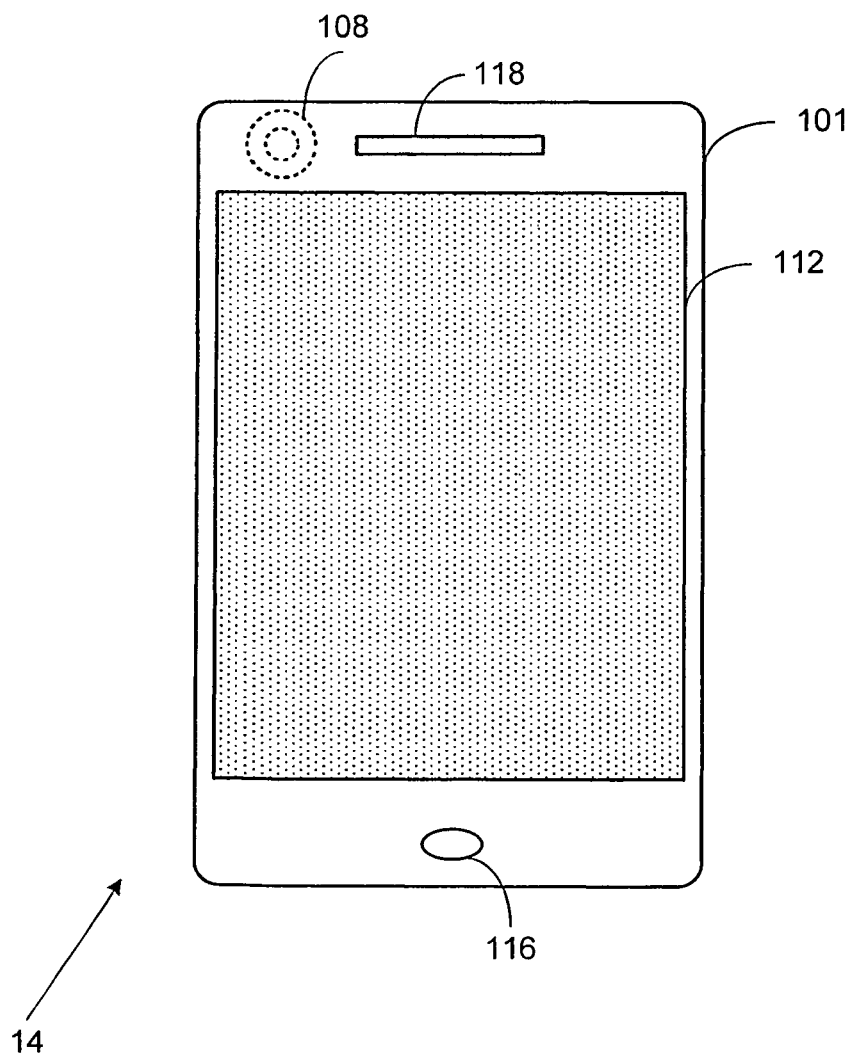
FIG. 1 illustrates an augmented reality enabled device according to some aspects of the present disclosure.

FIG. 1 illustrates an augmented reality enabled device according to some aspects of the present disclosure. As shown in FIG. 1, the augmented reality enabled device (ARD) 14 includes housing 101, display 112, one or more speakers 118, and microphone 116. The display 112, which may be a touch screen display, may illustrate images captured by the camera 108, or any other desired user interface information. Of course, the ARD 14 may include additional components that are not necessarily related to the present disclosure.

As used herein, an ARD device refers to any portable electronic device such as a cellular or other wireless communication device, personal communication system (PCS) device, personal navigation device (PND), Personal Information Manager (PIM), Personal Digital Assistant (PDA), laptop or other suitable mobile platform. The mobile platform may be capable of receiving wireless communication and/or navigation signals, such as navigation positioning signals. The term ARD is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, ARD is intended to include all electronic devices, including wireless communication devices, computers, laptops, tablet computers, smart phones, digital cameras etc. which are capable of capturing images used in pose tracking, as well as capable of performing augmented reality user interface functions.

Figure 2:
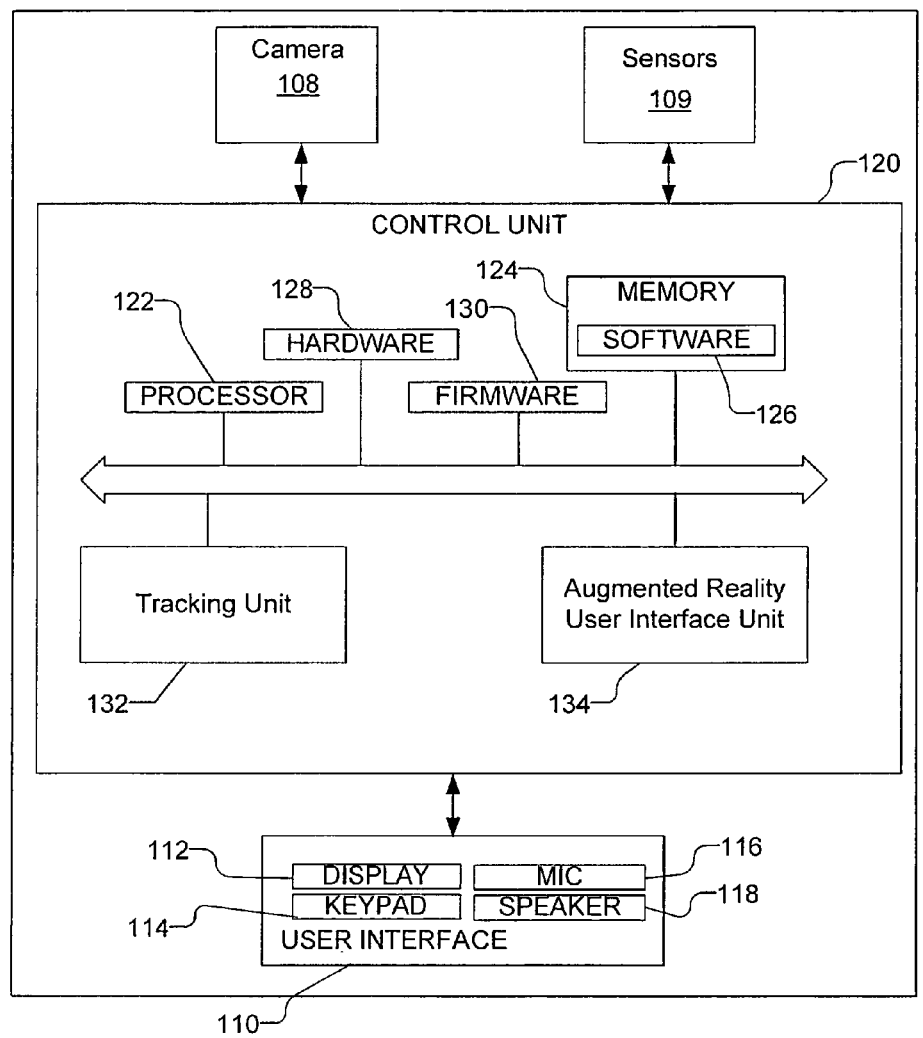
FIG. 2 illustrates a block diagram of an exemplary augmented reality enabled device according to some aspects of the present disclosure.

FIG. 2 illustrates a block diagram of an exemplary augmented reality enabled device according to some aspects of the present disclosure. The mobile platform of the ARD 14 includes a camera 108 for capturing images of the environment, which may be either individual photos or frames of video. The mobile platform of the ARD 14 may also include sensors 109, which may be used to provide data with which the mobile platform of the ARD 14 can determine its position and orientation, i.e., pose. Examples of sensors that may be used with the mobile platform of the ARD 14 include accelerometers, quartz sensors, gyros, micro-electromechanical system (MEMS) sensors used as linear accelerometers, as well as magnetometers.

The mobile platform of the ARD 14 may also include a user interface 110 that includes display 112 capable of displaying images. The user interface 110 may also include a keypad 114 or other input device through which the user can input information into the mobile platform of the ARD 14. If desired, the keypad 114 may be obviated by integrating a virtual keypad into the display 112 with a touch sensor. The user interface 110 may also include a microphone 116 and one or more speakers 118, for example, if the mobile platform is a cellular telephone. Of course, mobile platform of the ARD 14 may include other components unrelated to the present disclosure.

The mobile platform of the ARD 14 further includes a control unit 120 that can be connected to and communicates with the camera 108 and sensors 109, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a tracking unit 132 configured to track the position of the ARD 14 as well as to track positions of one or more objects monitored by the ARD 14. The control unit 120 may further include augmented reality user interface unit 134 configured to present augmented reality interactions on the display 112 of the ARD 14. The tracking unit 132 and augmented reality user interface unit 134 are illustrated separately from processor 122 and/or hardware 128 for clarity, but may be combined and/or implemented in the processor 122 and/or hardware 128 based on instructions in the software 126 and the firmware 130.

According to aspects of the present disclosure, the ARD 14 may be used in conjunction with one or more tangible interface items. In many of the examples described herein, the tangible interface items are referred to as "objects" or "toys." However, other types of tangible objects may also be used and the techniques disclosed herein are not limited to toys. For example, the tangible interface items may include one or more items in the user's environment, such as a cola can, a coffee cup, a magazine, or other tangible item that may be within the field of view of the camera of the ARD 14.

The augmentation provided by the ARD 14 can form a continuous story path. Such a continuous story path may be referred to herein as a "scene." The augmentation logic of the ARD 14 can be configured to monitor the attentiveness of a user and to change scenes if it appears that the user has lost interest in a particular scene. Techniques for interacting with the user and for tailoring the augmentation content provided by the ARD 14 are described in greater detail below.

According to embodiments of the present disclosure, the ARD may be configured to avoid accidental triggering of augmentation, which can disrupt a play and frustrate the user. In addition, knowing situations where an event may be triggered can invite further explorations and interactions, and thus enhances user experience.

Figure 3:
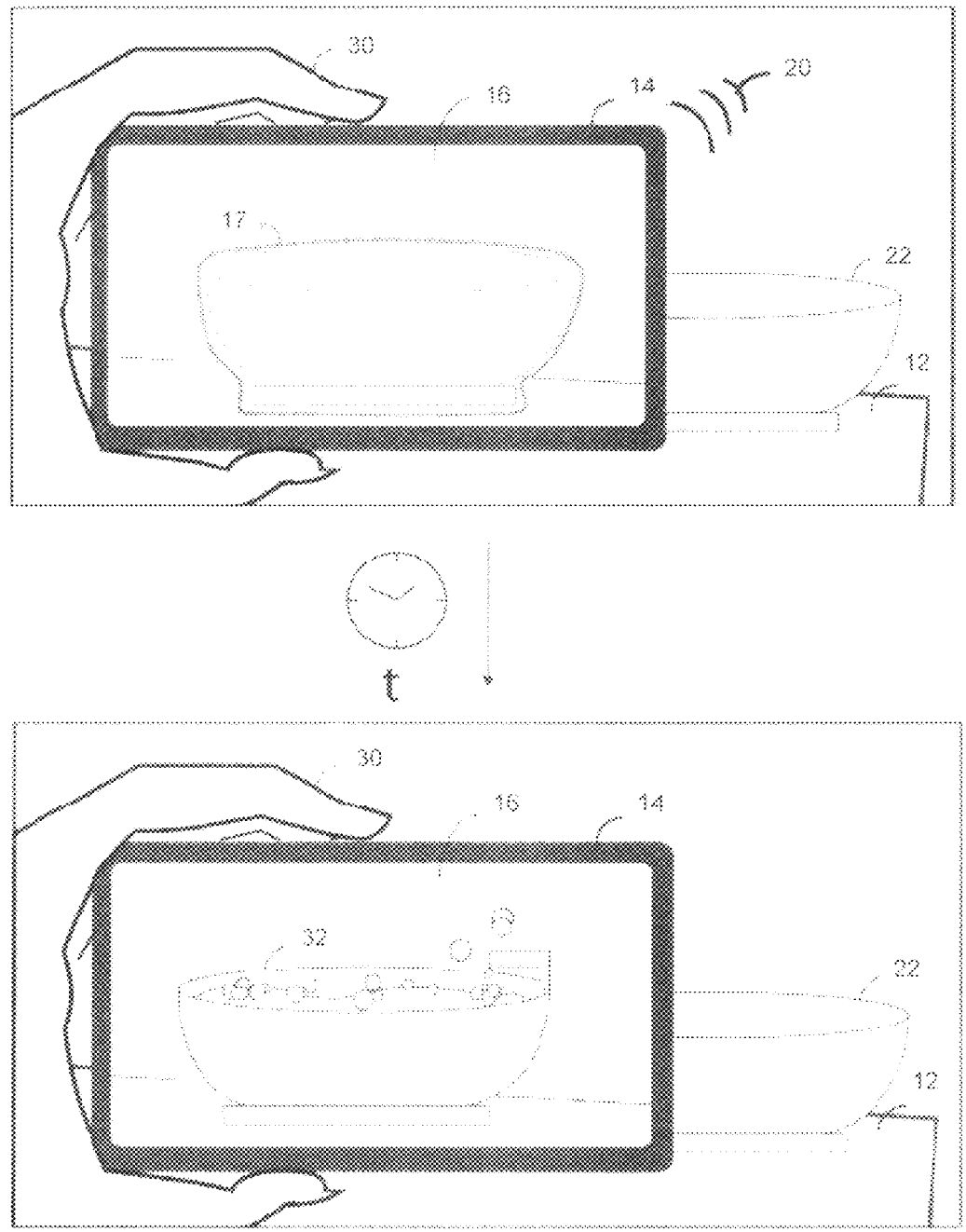
FIG. 3 illustrates a method of providing augmentation based at least in part on a trigger from a user according to some aspects of the present disclosure.

In some implementations, when a user performs a triggering action (e.g. zooms in on the bathtub 22), an indication of the impending trigger 17 can be monitored for time t (e.g. 0.2 to 0.8 sec) before the item triggers, giving the user a chance to change action thus avoiding triggering, as illustrated in FIG. 3. The indication may be in the form of: 1) visual indicator 17 (for example the visual indicator gets brighter or shimmers, or begins to shake); 2) audio (20) (e.g. a magic fairy dust sound); and 3) a combination of visual and audio. In other implementations, when the user performs a triggering action, for example zooming in on an object, they can hold that action for a predetermined period of time before the action triggers.

In one approach, the implementation of "hold" can be determined based at least in part on various user factors for the target application, for example, for pre-school children versus for teenagers or for adults. The factors may include, but not limited to, developmental state, and conditional factors, such as autism, partial sightedness, Parkinson's disease, and etc. In another approach, the implementation of "hold" may include, but not limited to 1) an adjustable degree of stillness; 2) an adjustable time on target; and 3) an adjustable tolerance for temporary loss of target.

According to aspects of the present disclosure, for adjustable degree of stillness, if pre-school children are the application audience, the implementation can allow gross movement, but if adults are the application audience, the implementation can allow minimal movement. For adjustable time on target, if pre-school children are the application audience, a time between 1 to 3 seconds may be used, but If adults are the application audience, a time between 0.2 to 0.6 second may be used. For adjustable tolerance of temporary loss of target, if pre-school children are the application audience, the implementation can allow loss of target during gross movement; but if adults are the application audience, the implementation can allow no loss of target.

Figure 4:
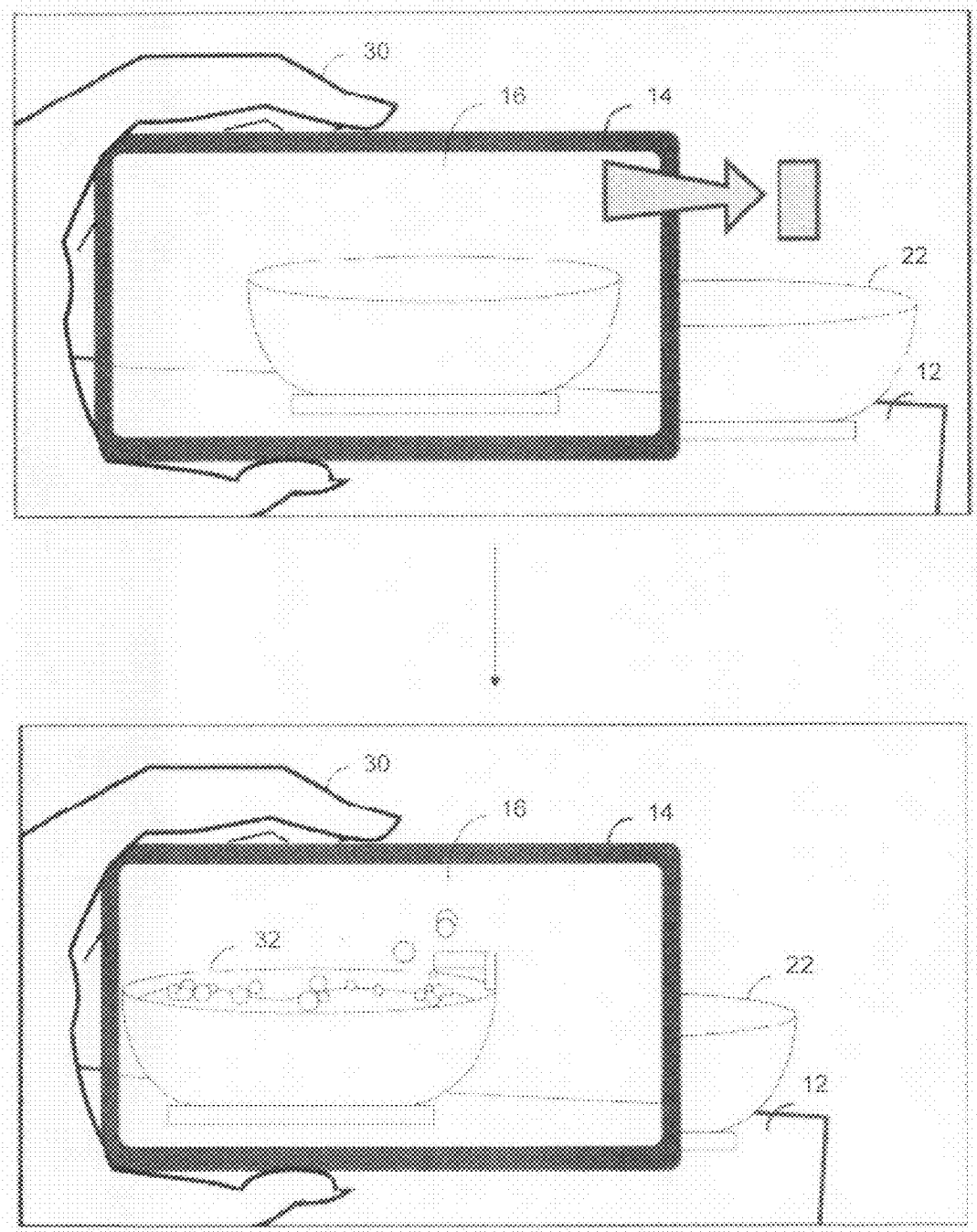
FIG. 4 illustrates another method of providing augmentation based at least in part on relative velocity between an augmented reality enabled device and a target according to some aspects of the present disclosure.

In yet other implementations, the user may use a secondary interaction method, such as a voice command, to trigger event. In addition, the ARD's sensor data can be used to determine velocity, acceleration, and/or deceleration in order to distinguish movement to a new target from "looking around" as shown in FIG. 4. In one approach, if the movement rapidly decelerates when an object comes into view (indicated by the grey arrow and rectangle), the control unit of the ARD can be configured to determine whether the user wishes to select/interact with the object. Upon a determination the object is selected, an augmentation may be triggered where overshoot and come back may be registered with the following scenarios, including but not limited to: 1) movement of the ARD 14 rapidly decelerates when an object comes into view; 2) target goes out of view before the ARD comes to a stop; 3) the ARD movement is immediately reversed or corrected to bring the object back into view; and 4) ARD is stopped with the object in view.

In another approach, if the velocity changes more subtly, the control unit 120 of the ARD may be configured to determine whether the user is looking around. It may perform the following functions, including but not limited to, 1) does not start augmentation; 2) shows indications of objects that may have augmentation (e.g. glow, slight shake, still overlay . . . ) but does not start animated augmentation; and 3) start augmentation if the user initiates interaction with the object by a) stopping abruptly on the object, b) keeping the object in the camera view for a predetermined period of time, or c) any other direct or indirect means unrelated to velocity.

Figure 5:
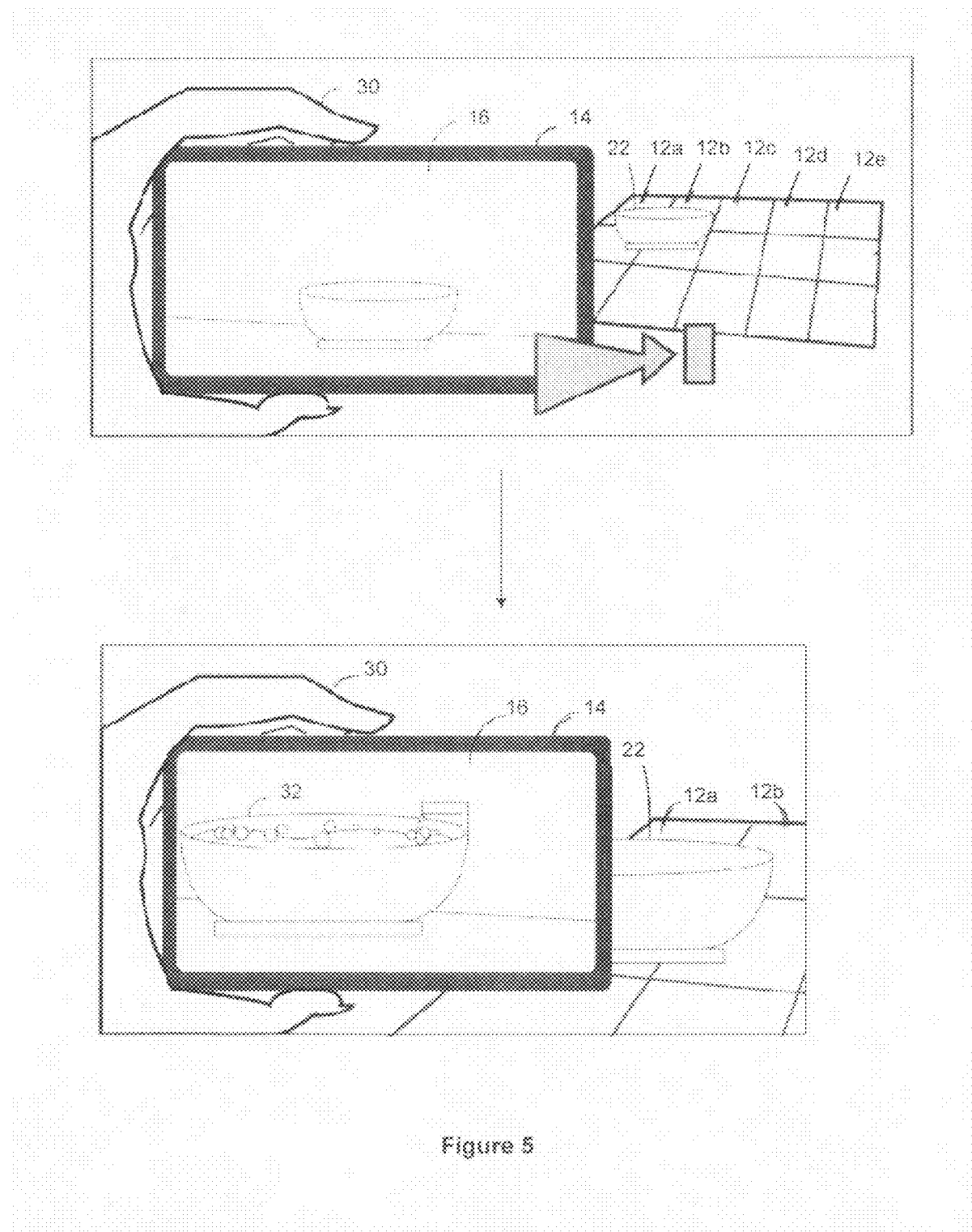
FIG. 5 illustrates yet another method of providing augmentation based at least in part on relative movement between an augmented reality enabled device and a background according to some aspects of the present disclosure.

In yet other implementations, the control unit of the ARD can be configured to use a reference background 12, for example a mat, to track movement of the ARD 14 by applying control logic associated with targeting versus looking around. In one approach, the control unit 120 can be configured to use sub-markings on the mat or tracking different areas of the mat separately. In yet other implementations, the method of tracking movement of the ARD (indicated by the grey arrow and rectangle) with respect to a reference background 12 (such as a mat) may include but not limited to: 1) tracking sub areas of the mat; 2) tracking markings or sub-features on the mat; 3) tracking multiple small mats that may be combined, temporarily or permanently, to form a larger mat (for example tiles on a bathroom floor, such as 12a-12e) as illustrated in FIG. 5; and 4) tracking relationships of these sub-areas/markings/small mats to the overall mat such that having one sub-area/marking/small mat in the camera view can enable the ARD 14 to determine where on the larger mat the user may be looking at.

Figure 6:
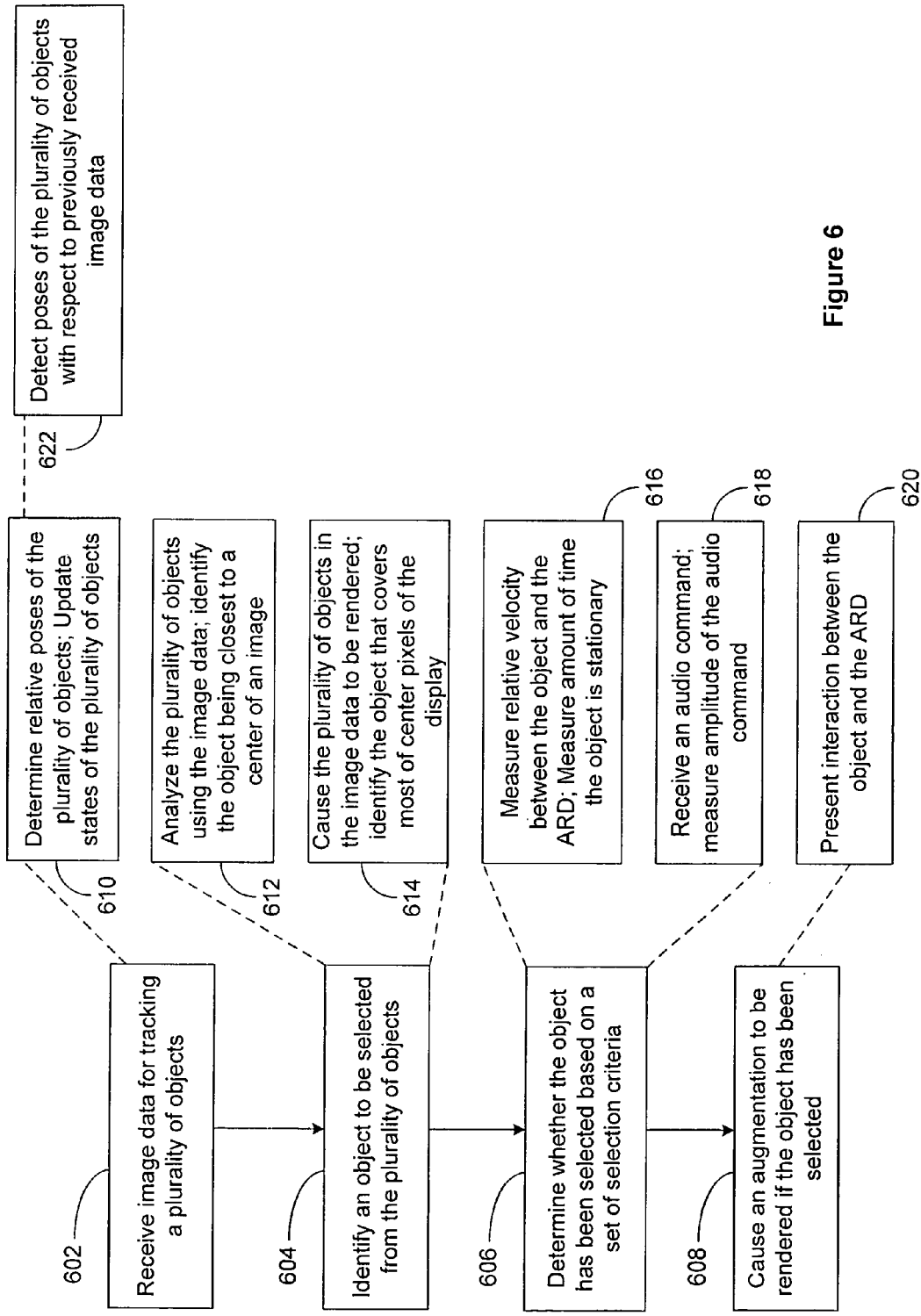
FIG. 6 illustrates a flow diagram for controlling an augmented reality interface according to some aspects of the present disclosure.

According to some aspects of the present disclosure, the functions described in FIG. 6 may be implemented by the control unit 120 of FIG. 2. In some implementations, the functions may be performed by processor 122, software 126, hardware 128, and firmware 130, or a combination of these blocks to perform various functions of the ARD described above, including the functions performed by the tracking unit 132 and the augmented reality user interface unit 134.

FIG. 6 illustrates a flow diagram for controlling an augmented reality interface according to some aspects of the present disclosure. In block 602, the control unit 120 can be configured to receive image data for tracking a plurality of objects. In block 604, the control unit 120 can be configured to identify an object to be selected from the plurality of objects. In block 606, the control unit 120 can be configured to determine whether the object has been selected based at least in part on a set of selection criteria. In block 608, the control unit 120 can be configured to cause an augmentation to be rendered with the object if it is determined that the object has been selected.

According to embodiments of the present disclosure, the methods performed in block 602 may further include methods performed in blocks 610 and 622. For example, in block 610, the control unit 120 can be configured to determine relative poses of the plurality of objects with respect to the ARD, and update states of the plurality of objects using the relative poses, where the states of the plurality of objects include relational information of the plurality of objects. The methods performed in block 610 may further include method performed in block 622, where the control unit 120 detects poses of the plurality of objects with respect to previously received image data of the plurality of objects. Note that the relational information comprises at least one of relationships among the plurality of objects in a game, relationships among the plurality of objects in a story, and relationships between the plurality of objects with respect to a background.

The methods performed in block 604 may further include methods performed in blocks 612 and 614. In block 612, the control unit 120 analyzes the plurality of objects using the image data, and identifies the object being closest to a center of an image represented by the image data. In block 614, the control unit 120 causes the plurality of objects in the image data to be rendered on a display of the ARD, and identifies the object that covers most of center pixels of the display of the ARD. The methods performed in block 604 may further include determining that the object has been zoomed in on.

The methods performed in block 606 may further include methods performed in blocks 616 and 618. In block 616, the control unit 120 measures relative velocities between the object and the ARD, and measures amount of time the object is stationary with respect to the ARD. In block 618, the control unit 120 receives an audio command, and measures amplitude of the audio command.

The set of selection criteria comprises at least one of the object being in view of the ARD for a predetermined period of time, the object being in view of the ARD and a relative velocity between the object and the ARD being below a predetermined threshold, and the object being in view of the ARD and amplitude of an audio command exceeding a predetermined value.

The methods performed in block 608 may further include methods performed in block 620, where the control unit 120 presents interactions between the object and the ARD in a display of the ARD.

Referring to block 606, the methods may further include causing an indicator to be presented, where the indicator indicating that the object has been identified, and determining whether the object is deselected in response to the presentation of the indicator. The determining of whether the object is deselected comprises determining that the object has been selected if a position of the object with respect to the ARD is maintained for a threshold amount of time after presentation of the indicator. The indicator comprises at least one of an icon, a vibration of the object on a display of the ARD, and a representation of an elapsed time.

According to some aspects of the present disclosure, a method for use with an ARD comprises causing an image of a scene to be displayed on a display of the ARD, where the scene including one or more objects, causing the displayed image to be augmented with an indicator identifying an object of to be selected from the plurality of objects, and determining whether the object has been deselected subsequent to the image being augmented with the indicator.

Techniques for providing voice and tangible user interfaces for augmented reality are provided. The various example implementations illustrated herein can be implemented on an ARD. The ARD 14 can be a mobile phone, tablet computer, or other such devices that includes a processor for executing machine executable machine executable instructions, a camera for capturing images or video of a real-world environment, and a display for displaying an augmented reality view of the real-world environment. These techniques can be integrated in a wide variety of augmented reality applications to create a more satisfying and engaging user experience than conventional AR applications.

Figure 7:
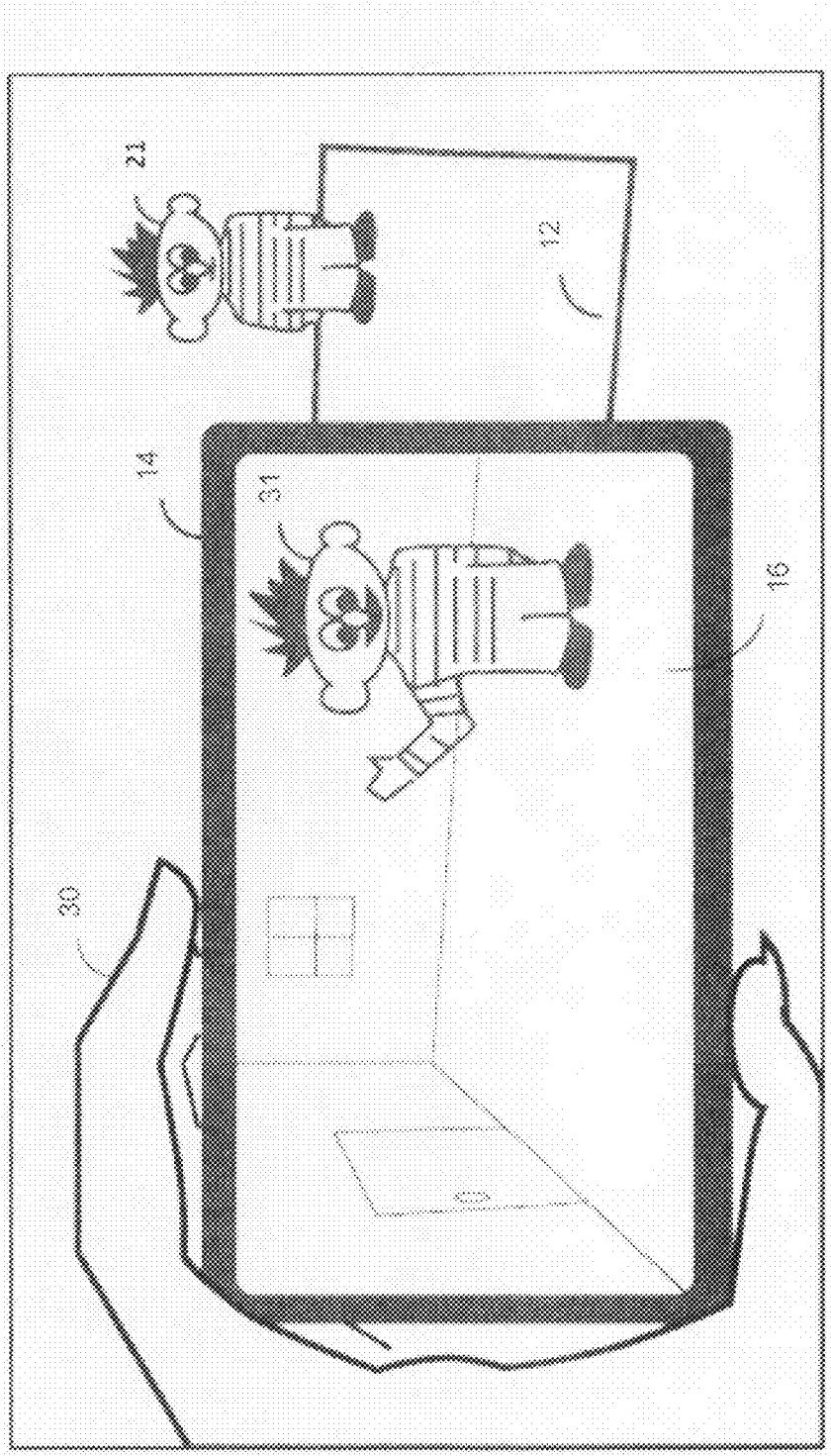
FIG. 7 illustrates an example of an augmented reality enabled device being used to provide augmented reality content associated with real-world objects.

FIG. 7 illustrates an example of a play environment where an ARD 14 is being used in conjunction with real-world items to provide an enhanced user experience. In the example of FIG. 7, the reference background 12 such as a mat can serve as a "floor" for a representation of a room in both the real-world and in the AR environment. In this example, the augmentation provided by the ARD 14 includes walls and other features of the room that are not present in the real world environment. The ARD 14 can also provide augmentation for one or more objects placed on the mat. The ARD 14 can also be configured to recognize objects that are present in the field of the camera of the ARD 14, regardless of whether the objects are placed on a reference surface 12, such as the mat illustrated in FIG. 7.

As shown in the example of FIG. 7, one or more toys may be placed on the mat. The toy 21 is represented in the AR environment displayed on ARD 14 as an augmented reality representation 31 of the character represented by toy 21. The user can interact with both the toy 21 and the augmented reality representation 31 of the character provided on the ARD 14. In the AR environment illustrated on the device, the toy 21 can be animated and respond to user interactions. For example, the augmented reality representation of the character 31 may move about in the AR environment (e.g., dance, sit, stand, etc.) and interact with the user (e.g., sing, speak, or listen for user responses). The augmented reality representation of the character 31 can also provide contextually-relevant responses to user vocalizations by analyzing user vocalizations and providing augmentation.

In one exemplary application, the control unit 120 can be configured to track a radio in view of the device, provide an augmentation of a song playing by the radio, and adjust a volume of the song based on determining that the radio has been spun. In another exemplary application, the control unit 120 can be configured to track a television in view of the device, determining that an object has been placed near the television, and trigger an augmentation of video playing on the television based on the placed object. In yet another exemplary application, the control unit 120 can be configured to track a post-it note that shows a reminder of a TV show, and causes changes to record settings of a digital video recorder to record the TV show.

FIGS. 8A, 8B, 8C, and 8D illustrate an example of an augmented reality enabled device being used as an automated home control device. In the example illustrated in FIGS. 8A, 8B, 8C, and 8D, a household item 29, a cola can, and household item 12, a magazine, is illustrated and augmented object 34 is provided for the household items 29 and 12 on the ARD 14. Other types of household object or other types of objects may also be used.

In some implementations, the augmented object 34 can completely cover the tangible object (may also be referred to as real-world object or real object) associated with the augmented object 34. In other implementations, the augmented object 34 can cover only part of the tangible item. For example, the tangible item may be seen covered by a part of the augmented object 34 or the tangible item may be filtered to provide a more subtle appearance. Some examples of the types of filters that may be applied are filters to reduce the brightness, contrast, and/or saturation of the tangible item relative to the rest of the scene. In some implementations, environmental augmentation can be used to cover all or some of a tangible item, even if the augmentation content may be smaller than the image of the item. For example, the augmentation content 16 covers the tangible item, magazine 12, in the example illustrated in FIG. 8A. The augmentation content 16 may be smaller than the cola can 29, but the environmental augmentation has reduced the contrast and saturation of the can in the augmentation content displayed by the ARD 14.

In some implementations, such as in the example illustrated in FIGS. 8A, 8B, 8C, and 8D, the augmentation content provided for a tangible item may be of a different type of object than the tangible item. For example, the cola can 29 in FIGS. 8A, 8B, 8C, and 8D has been replaced with augmented object 34 that looks like a television set. Other types of representations may be used. The association of augmentation content with a tangible item can be: (1) permanent—lasting across multiple AR session until the association between the tangible item and the augmentation content is reassigned; (2) sticky—lasting the duration of a usage session (e.g. as long as the application is turned on); or (3) loose, lasting just for the duration of the "scene."

According to aspects of the present disclosure, certain objects that can be used in conjunction with the ARD 14 may have aspects of personification associated with them, such as one or more facial features (e.g., eyes, mouth, or ears) or other features (e.g., animated movement). The augmentation logic of the ARD 14 can be configured to provide augmentation content associated with a uses these aspects of personification to communicate with a user of the device. For example, an augmented representation of the toy can be animated to exhibit emotions, move about a scene, sing, talk, and show focus (or "listen") to the user.

An object may reside on a target reference background. For example, a toy may reside on a floor, tabletop, a play mat, or other surface. The ARD 14 can be configured to track a reference floor plus one or more toys. The ARD 14 can optionally overlay background augmentation over the floor and other parts of the real world in the AR view provided by the ARD 14. FIGS. 8A, 8B, 8C, and 8D illustrate an example where an item, cola can 29, resides on a target reference background 12, such as a magazine, which can serve as a reference plane for the augmented content displayed on the ARD 14. Other target reference backgrounds, such as a table top, a book, a piece of paper, a wall, or other item can also service as the reference plane. Inclusion of a reference plane in the augmentation content provided by the ARD 14 can be optional.

Figure 8A:
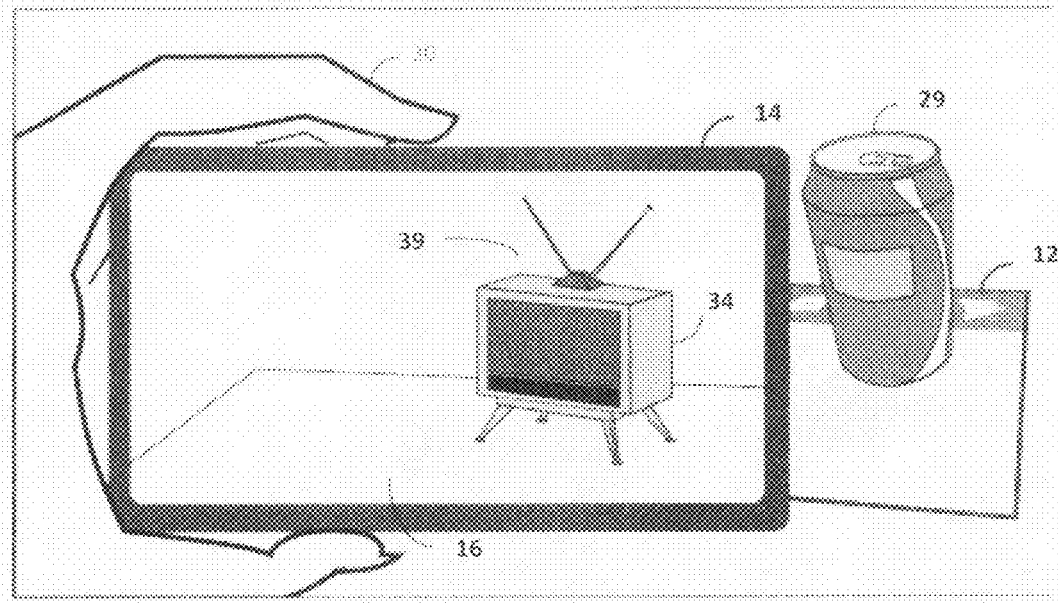
FIGS. 8A, 8B, 8C, and 8D illustrate an example of an augmented reality enabled device being used as an automated home control device according to some aspects of the present disclosure.
Figure 8B:
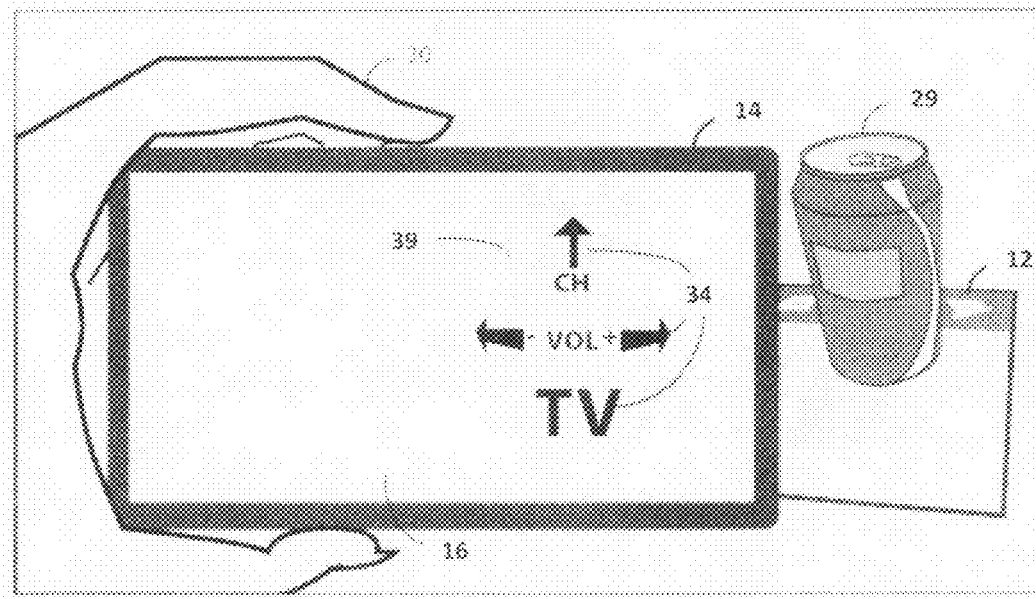
Figure 8C:
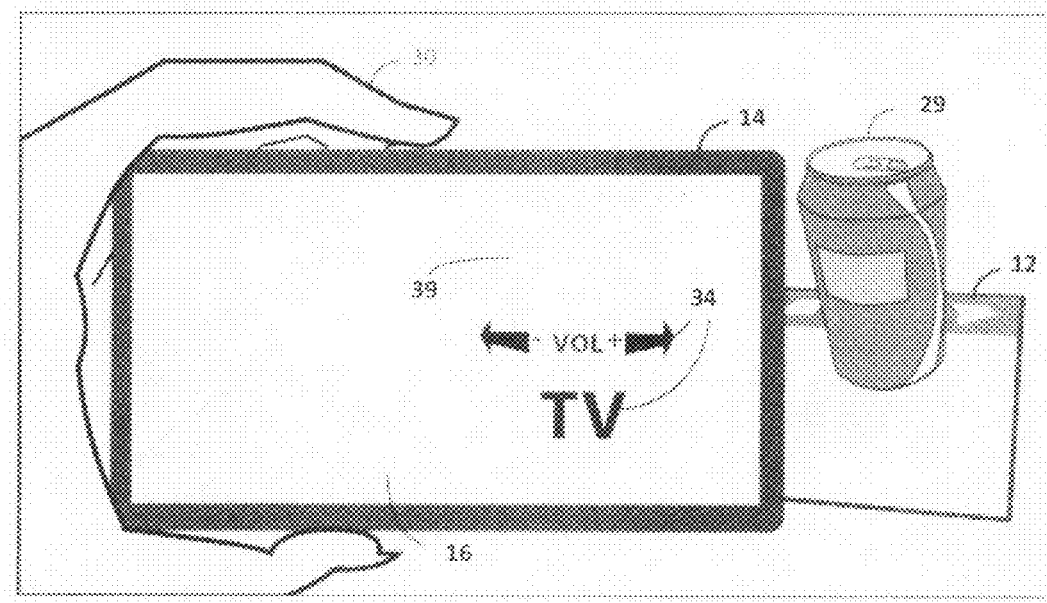
Figure 8D:
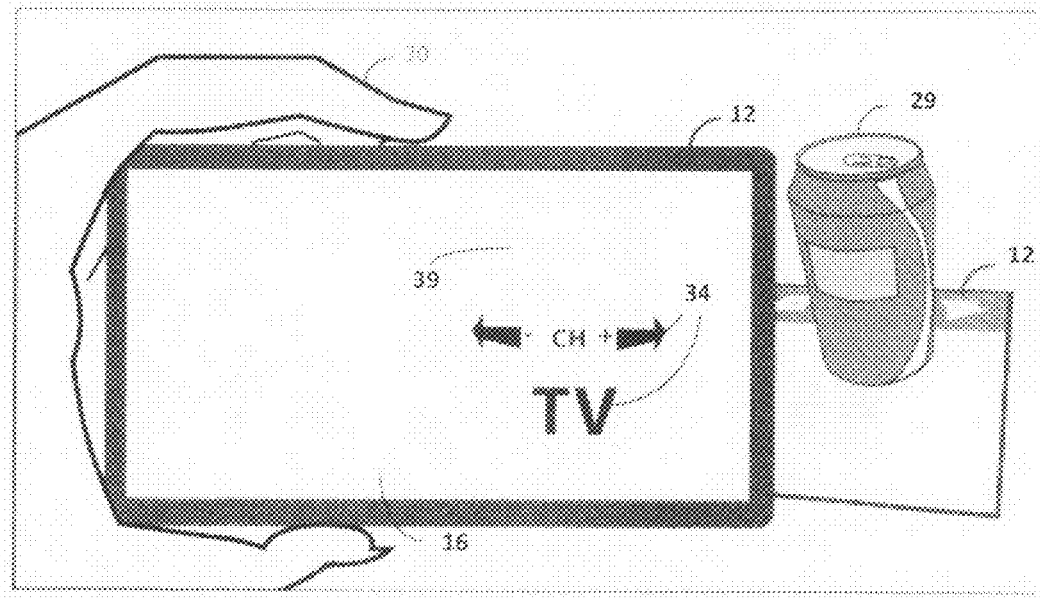

In the example illustrated in FIGS. 8A, 8B, 8C, and 8D an object found on the coffee table of the user of the ARD 14 may be configured to control a television 34 or other electronic device. In this example, cola can 29 is associated with a real-world television and can be used to control certain functions of the television set, such as the channel and volume. As can be seen in FIGS. 8A, 8B, 8C, and 8D, the ARD 14 can be configured to display augmented reality content 16 associated with the cola can 29 that includes a representation of a television set. The augmentation content 16 can include a representation of the device to be controlled. FIGS. 8B, 8C, and 8D illustrate an example where the real-world item, the cola can 29 can serve as a remote control to a real-world television set. The ARD 14 provides augmentation content 16 that represents controls that can be used to control certain functions of the television. In the example illustrates in FIGS. 8B, 8C, and 8D, the user can control certain functions of the television by moving or manipulating a real-world object, the cola can 29. For example, in FIG. 8B, the user can rotate the cola can 29 to the left or the right to adjust the volume of the television or move the can up or down to change the channel on the television. In the example illustrated in FIG. 8C, the user can rotate the cola can 29 to the left or the right to adjust the volume of the television, and in the example illustrated in FIG. 8D, the use can rotate the cola can 29 to the left or the right to change the channel of the television.

While the controls are represented as arrows in the examples illustrated in FIGS. 8B, 8C, and 8D, other types of controls may be included in the augmentation content 16, such as a representation of the usable state of the augmentation (e.g., a knob, a button, a lever), directions for usage (e.g., arrows and icons for how to twist or lift the cola can 29 to affect the volume or change channel on the TV) or a combination of these elements. In the example illustrated in FIGS. 8B, 8C, and 8D, the magazine 12 may serve as a reference plane 16 in the augmentation content displayed by the ARD 14 114. In this example, the magazine 12 serves as a reference plane for determining whether the can 29 has been moved.

Figure 9:
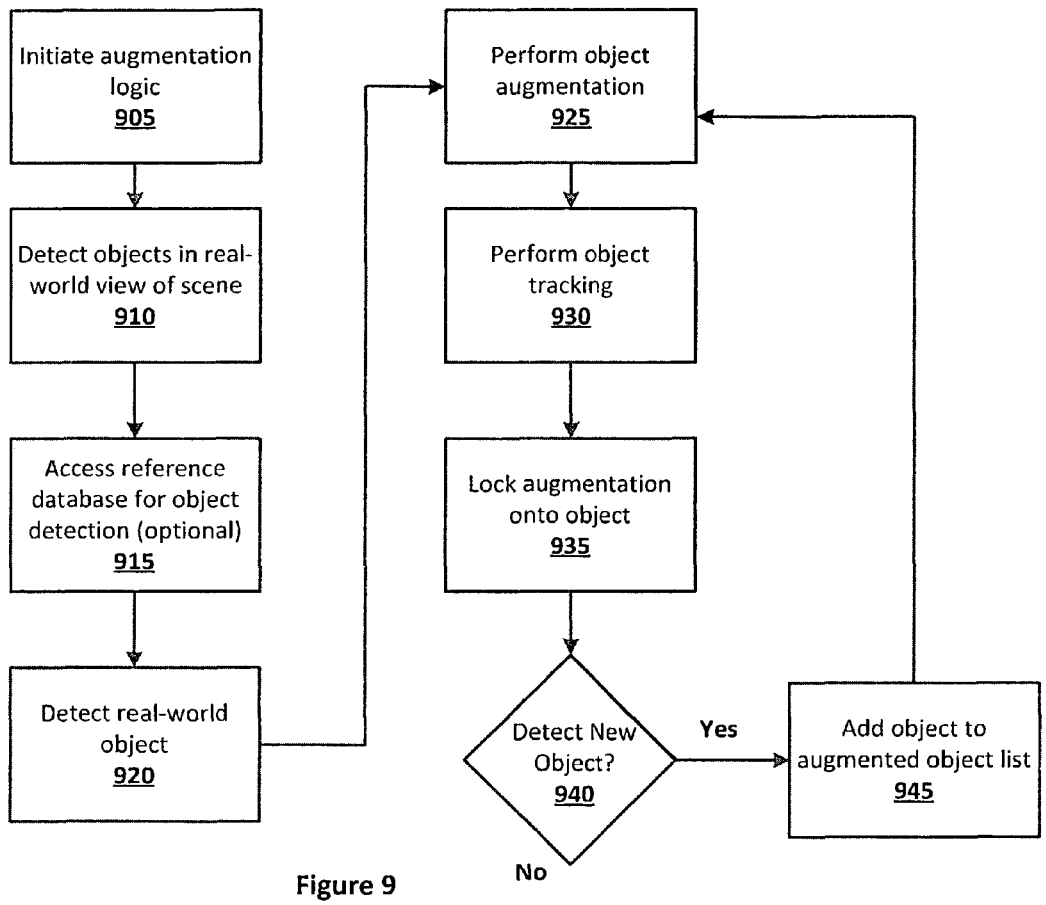
FIG. 9 illustrates a flow diagram of an example method for providing augmented reality content on an augmented reality enabled device according to some aspects of the present disclosure.

FIG. 9 is a flow diagram of an example method for providing augmented reality on an ARD 14. The control unit 120 of ARD 14 may include augmentation logic for providing an augmented reality experience (block 905). The augmentation logic performs object detection to detect objects in the field of view of the camera of the ARD 14 (block 910). The augmentation logic can also optionally access a reference database for object detection (block 915). The reference database can include attributes of various types of objects that may be augmented by the augmentation logic, and the augmentation logic can compare the attribute of objects detected in video or images captured by the camera of the ARD 14. The augmentation logic can then detect tangible target items in the field of view of the camera of the ARD 14 (block 920). The objects can be detected using the reference information to classify the type of object that is found (if the reference database is available). Once an object has been detected, the augmentation logic can perform object augmentation (block 925). The augmentation logic can also then perform object tracking (block 930). For example, referring back to FIG. 7, if the user moves the toy 21 to a different location with the field of view of the camera or the user moves the ARD such that the toy 21 moves within the field of view of the camera, the augmentation logic can track the location of the object within the "viewport" displayed on the ARD 14 and display the augmentation for the object at the new location of the object (block 935). The augmentation logic can also periodically make a determination whether any new objects have entered the field of view of the camera (block 940). If a new object is detected, the object can be added to a list of objects to be tracked and augmented (block 945) and the augmentation logic can continue to perform object augmentation on the objects that have been detected (block 925).

The following examples illustrate how the augmented reality techniques disclosed herein can be implemented in a augmented-reality capable device.

According to aspects of the present disclosure, the ARD 14 may be configured to control a combination of augmented reality, tangible and voice user interface for social play. In one implementation, the ARD 14 may be configured to encourage social play exploration and learning. This technique rewards vocalizations to encourage language development and provides brain stimulation. The user can be rewarded for vocalizations made while interacting with the ARD 14. For example, a user 30 may be engaged in social play with a character 21. The augmented reality representation of the character 31 displayed on the device 14 held by the user may be displaying listening augmentation while the user is vocalizing. The listening augmentation associated with the character can include the character stop talking, facing the user by "looking" toward the screen of the device, and other such actions that indicate attentiveness and encourage the user to vocalize.

The character in the augmented reality representation displayed on the device can be configured to respond to and/or elicit responses from the user. The ARD 14 can include augmentation logic to control the behavior of characters in the augmented reality representation of the scene. In the example following example, the augmentation logic associated with a character can be configured to respond to audio events detected in a microphone input of the ARD 14.

Referring once again to the examples illustrated in FIGS. 8A, 8B, 8C, and 8D, voice commands can be used to interact with the augmented view displayed by the ARD 14. For example, the user 30 can point the camera toward an item, such as the cola can 29, and say "TV" to associate the cola can 29 with the television in the real world environment. The ARD 14 can be configured to display augmentation content 16 associated with the television 34 over the cola can 29, such as the representation of the television (FIG. 8A) or associated with the controls for controlling functions of the television (FIGS. 8B, 8C, and 8D). Voice commands can also be used to assign attributes to an item. For example, the user can say "Volume" to add volume controls to the augmentation content 16 associated with the cola can 29 in the scene displayed by the ARD 14, or the user may say "Channel" to add channel controls to the augmentation content 16 associated with the cola can 29 in the scene displayed by the ARD 14. The user can then interact with the controls provided with the augmentation content 16 via voice commands, a touchscreen of the ARD 14, or other user interfaces.

Figure 10:
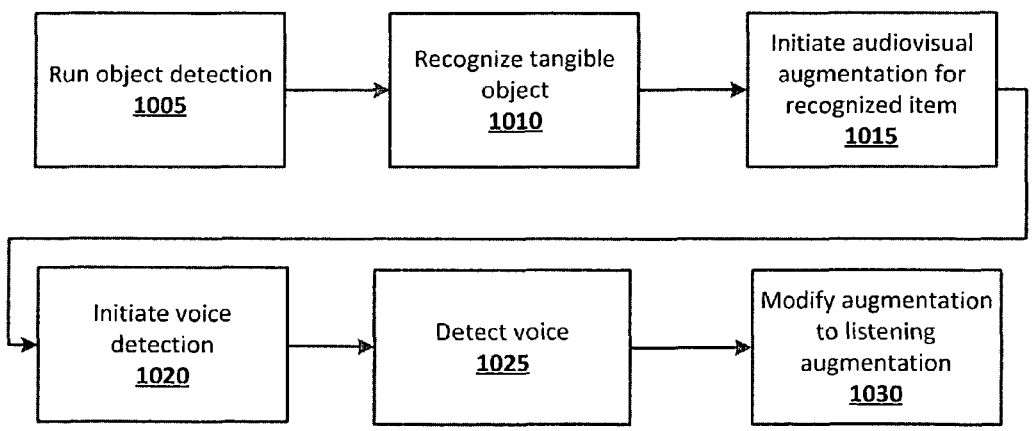
FIG. 10 illustrates a flow diagram of an example method for providing augmented reality content on an augmented reality enabled device according to some aspects of the present disclosure.

FIG. 10 is a flow diagram of an example method for providing augmented reality on an ARD 14. The ARD 14 runs object detection to detect objects in the field of view (block 1005). As described above, the ARD 14 includes a camera that can capture images or video of a real-world scene. The augmentation logic of the ARD 14 can analyze the images or video of the scene to detect objects to be augmented. For example, toys or other real world items can be detected by the augmentation logic and augmentation provided for the detected objects. The ARD 14 can display a "viewport" that represents at least a portion of the real-world environment that is visible in the field of view of the camera of the ARD 14. The augmentation logic can be configured to overlay audiovisual content (referred to herein as "augmentation") over this view into the real world environment to provide a augmented reality view of the real-world environment. The augmentation logic can provide overlays over the background, foreground, and/or one or more tangible objects within the field of view of the ARD 14.

The augmentation logic of the ARD 14 can recognize a tangible object that may be within the field of view of the ARD 14 (block 1010). The augmentation logic can be configured to estimate the pose (the position and orientation) of one or more objects in real-time. The augmentation logic can be configured to recognize fiducial markers on the one or more objects in the real-world environment for recognizing tangible objects within the field of view of the ARD 14. The augmentation logic can also be configured to use natural feature tracking for recognizing tangible objects within the field of view of the ARD 14. The augmentation logic can also be configured to use other techniques or a combination thereof for recognizing tangible objects within the field of view of the ARD 14. The ARD 14 can then initiate audiovisual augmentation for the recognized item (block 1015). For example, if the recognized item is a doll, the augmentation logic may display an animated representation of the doll overlaid over the real-world object in the augmented view displayed by the ARD 14. The augmentation logic may also be configured to animate the representation to sing a song, talk, move about the AR environment displayed on the ARD 14, or other such behavior.

Voice detection can then be initiated by the augmentation logic (block 1020). If a voice is detected (block 1025), the augmentation logic can modify the augmentation for a character so that the character exhibits listening behavior (block 1030). For example, the character may exhibit one or more behaviors, such as stop talking, turning to face the screen of the ARD 14, cocking its head to the side in an attentive manner, and providing a verbal indication that the character is listening. For example, the character may be animated to utter "Umhum . . . Mmmm" periodically as the user is talking.

Figure 11:
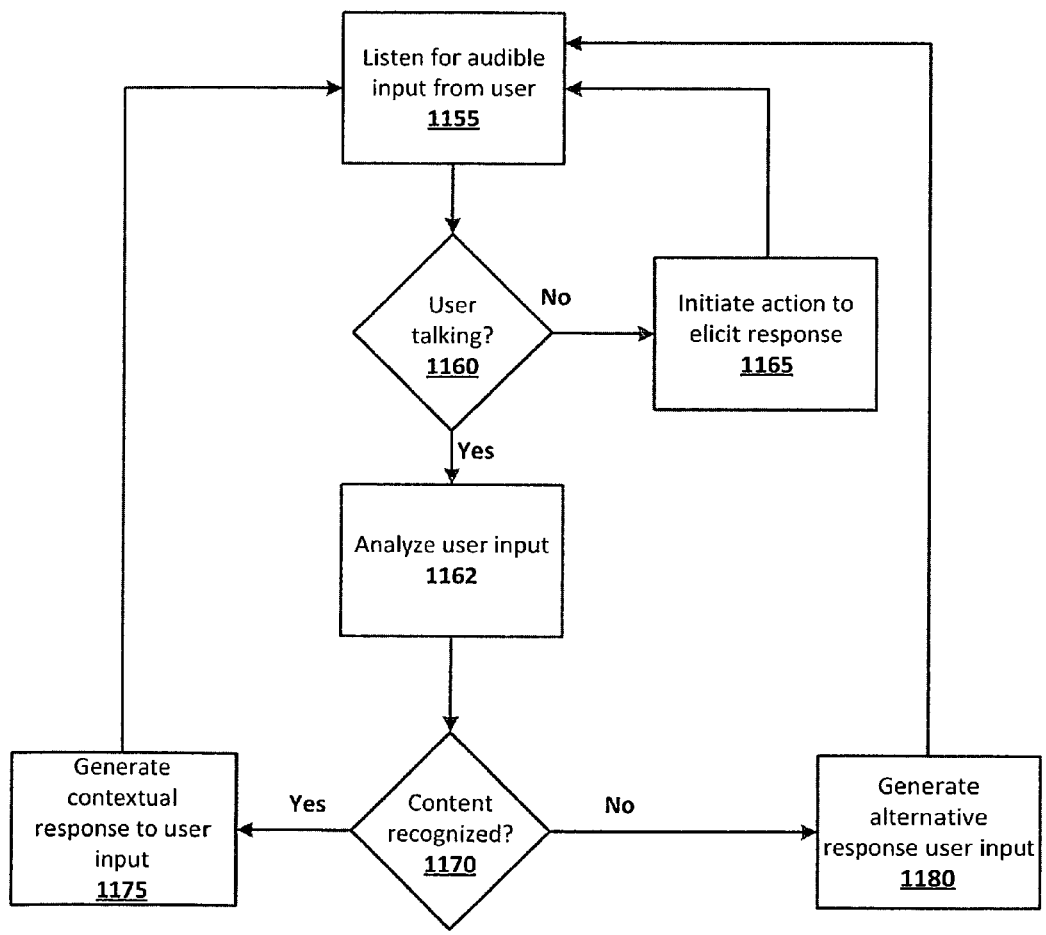
FIG. 11 illustrates a flow diagram of an example behavior method used to control the behavior of the augmented reality representation of a character based on audio inputs received from a user according to some aspects of the present disclosure.

FIG. 11 provides a flow diagram of a behavior method for a character based on audio inputs received from the user. The method begins with listening for audio input from the user (block 1155). The augmentation logic can then make determination whether the user is talking (block 1160). The method can be modified to recognize whether the user is talking, singing, clapping, whistling, or providing other types of user input (block 1162). If the user is not talking (or providing other types of audible response), an action to elicit a user response can be initiated (block 1165). A lack of audible response from the user can indicate a lack of attention from the user, which may indicate that the user has lost interest or is bored with the current scene. The augmentation logic can trigger the augmented reality representation of the character 31 to perform some action to draw in the attention of the user. For example, the augmentation logic may be configured to cause the augmented reality representation of the character 31 to begin to sing a song, dance, or perform some other action to elicit the attention of the user. The augmentation logic can also be configured to recognize whether the user has failed to respond for an extended period of time, which may indicate that the user has left, fallen asleep, or other is no longer engaged with the augmented reality and to shut down or enter into a "sleep mode" until audible from a user is once again detected.

If content in the user input is recognized (block 1170) as trigger content, a contextual response to the user input can be generated (block 1175). For example, if the user says the trigger word "dog," the augmentation logic can be configured to generate a contextual response, such as animating the character to provide the response "I like dogs!" In another example, if the sound of a laugh is detected, the augmentation logic can be configured to animate the character to laugh in response to the sound of laughter being detected in the user input.

Otherwise, if no contextual matches were found, or the audible response provided by the user was not intelligible, the augmentation logic can be configured to generate an alternative response to the audible input that is not based on the content of the audible input from the user (block 1180). For example, the augmentation logic can be configured to animate the augmented reality representation of the character 31 to say "What was that?" or "Oh, thank you for sharing that with me." The augmentation logic can be configured to return to block 1155 a continue listening for audible input from the user.

The augmentation logic can be further configured to further enrich the user experience. For example, the augmentation logic, can be configured to encourage a user to practice verbalization skills by encouraging the user to speak by using one or more of the following techniques.

The augmentation logic can be configured to recognizing when a user begins talking, and performing one or more of the following actions: (a) Halt talking if the augmented reality representation of the character 31 is currently talking to draw focus on the user's vocalizations. (b) Animate the augmented reality representation of the character 31 to provide the impression that the character is paying attention to the user. For example, the augmented reality representation of the character 31 can be animated to turn in the direction of the user. For example, the augmented reality representation of the character 31 can be configured to face toward the screen of the device in the augmented reality representation of the scene so that it appears that the augmented reality representation of the character 31 is facing the user. (c) Respond with animation and/or vocalization when the user stops talking.

The response with animation and/or vocalization can be configured to provide different levels of response. In response to a simple audio trigger, such as a noise, a laugh, a voice, a clap, the response provided by the augmented reality representation of the character 31 can be more vague and less context specific. For example, the character may be animated to respond with a smile and a nod or may make a simple exclamation, such as "Oh!" Where voice or sound recognition is implemented in the augmentation logic and a trigger sound or word is recognized, a more contextually appropriate response may be provided. For example, if a burst of laugher is detected, the augmentation logic can be configured to animate the augmented reality representation of the character 31 to laugh along with the user. In another example, if a loud noise is detected, the augmentation logic can be configured to animate the augmented reality representation of the character 31 to say "What was that?" In another example, if a voice is detected, the augmentation logic can be configured to animate the augmented reality representation of the character 31 to say "Thank you for sharing that with me!"

In some instances, the augmentation logic can be configured to leverage voice recognition algorithms to recognize a set of trigger words or phrases in an audible from the user, and to generate context appropriate response to the user's input. For example, if the user exclaims "Madison has a new dog, he is really fluffy" where the augmentation is configured to recognize the word "dog," the augmentation logic can be configured to animate the augmented reality representation of the character 31 to say "Oh, I like dogs!"

Recognizing specific words in the audio responses from a user can be particularly challenging where the user has not yet developed strong verbalization skills and the user's pronunciation may not yet be ideal. The augmentation logic can be configured to search for specific words in the audible input from the user based on the context of the scene. For example, if an augmented reality scene depicted on the ARD 14 depicts a dog, a pencil, an apple, and a duck, the augmentation logic can be configured to search for words associated with objects visible in the scene. For example, the augmentation logic may associate the dog with the words "dog," "puppy," and "doggie" and associate the duck with the words "duck," "bird," and "ducky."

The response to the user's audible input can also be tailored to a determined verbalization level of the user. For example, the augmentation logic can be configured to determine a level verbalization level associated with the user based on words identified in the user's responses. More complex words and/or phrases can be associated with a higher level of verbalization, and the augmentation logic can be configured to responds with an appropriate level of verbalization for the user. The augmentation logic can also be configured to select responses to user audio input that is associated with a slightly higher level of verbalization to encourage growth of verbalization skills of the user.

The content of the scene displayed by the ARD 14 can also be tailored to include one or more words or phrases uttered by a user into later parts of a scene. For example, if the user mentions a dog or soccer while interacting with the ARD 14, a dog or soccer may be integrated into the scene. For example, an augmented reality representation of the character 31 may play with a soccer ball, mention a dog, or play with a dog later in the scene. Integrating words or phrases uttered by the user into the scene may help to more fully engage the user with the AR environment provided by the ARD 14.

The augmentation logic can also be configured to drive the animation of the character and/or objects in the environment based on the voice input of the user. For example, if the user mentions that she won her soccer game, the augmented reality representation of the character 31 in a scene may respond by saying "You are so good at playing soccer." and begin playing with a soccer ball. If there are two more characters involved in the scene, the augmented reality representations of character 31 can be configured to interact with one another in response to audible inputs by the user. For example, an augmented reality representation of a first character may ask an augmented reality representation of a second character: "Do you like soccer too?" and the two characters may then start kicking a soccer ball back and forth.

The augmentation logic can be configured to engage the user and continue a conversation to encourage development of verbalization skills in the user. One technique for encouraging such vocalization includes continuing a conversion with a character even if the user moves the devices so that the character is outside of the field of view of the camera and thus no longer visible in the "viewport" provided by the ARD 14. If voice responses from the user continue to be detected, the conversion should be continued even if one or more characters involved in the conversation are no longer in the viewport of the ARD 14. Furthermore, if the user adds another character to the field of view of the ARD 14, that augmentation logic can be configured to identify the newly added character and to provide audiovisual augmentation for the newly added character. The newly added character can be included in a scene that is already in progress.

The augmentation logic can include a series of voice recognition schemes to apply to attempt to identify the audible responses provided by the user. The augmentation logic can be configured to use a graceful degradation scheme for determining how to respond to the user. For example, the augmentation logic can be configured to apply one or voice recognition schemes to the audible input where each scheme associates a proposed word or phrase to a vocalization and assigns a percentage certainty that the vocalization is that particular word or phrase. The augmentation logic can be configured to select a response that to the vocalization based on the certainty percentages. In the event that the certainty associated with a vocalization falls below a predetermined threshold, a simple audio trigger response can be issued in response to the vocalization, even though what the user was saying may not be determined with a desired level of certainty. Furthermore, if the no words can be identified in the user's audible response, the augmentation logic can be configured to apply identification logic to determine whether the audible response from the user was speech, a laugh, a cry, or non-vocalization (such as a clap). If a determination can be made, the augmentation logic can select an appropriate response to the user. If the audible response from the user cannot be classified, a simple audio trigger response can be selected by the augmentation logic.

According to aspects of the present disclosure, the ARD 14 may be configured to control a combination of augmented reality, tangible and voice user interface for ease of play. In one implementation, the ARD 14 may be configured to encourage social play exploration, language development, and brain stimulation and learning by rewarding vocalization. The ARD 14 can be configured to provide voice commands that the user can use to advance play and to enhance the user experience. In an example, as a user 30 plays with a tangible toy 21 and looks "through" the ARD 14 at an augmented scene 16, as in FIG. 7, the user's hands may be busy manipulating the toy 21 and holding the ARD 14. The user can interact with objects in the scene by presenting voice commands to the ARD 14.

Figure 12:
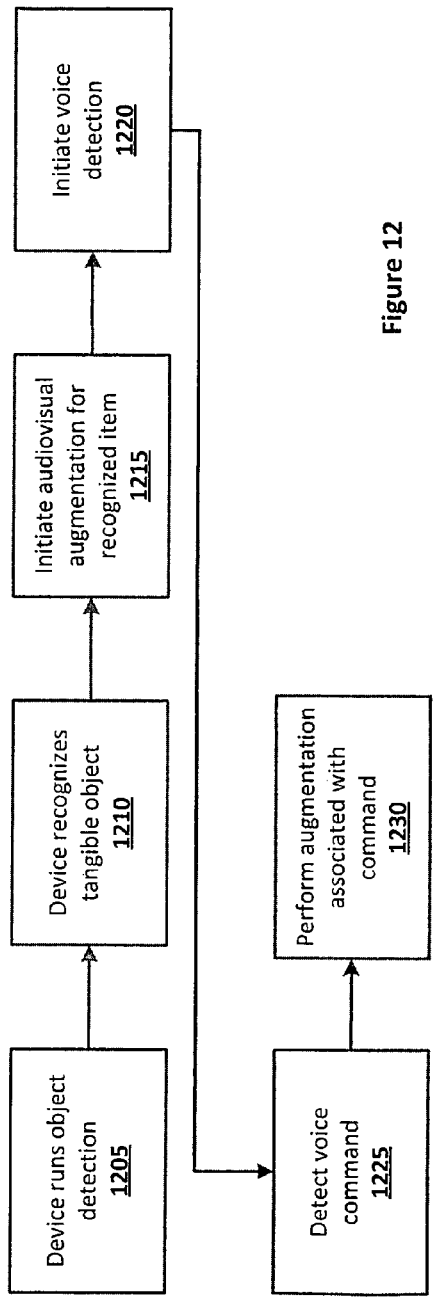
FIG. 12 illustrates a flow diagram of an example method for providing augmented reality on augmented reality enabled device that recognizes voice commands according to some aspects of the present disclosure.

FIG. 12 is a flow diagram of an example method for providing augmented reality on an ARD 14 that recognizes voice commands. The ARD 14 runs object detection (block 1205). As described above, the ARD 14 includes a camera that can capture images or video of a real-world scene. The ARD 14 can include augmentation logic that can analyze the images or video of the scene to detect objects, such as toys or other real-world items that may be augmented in the view provided by the ARD 14. The augmentation logic of the ARD 14 can then recognize a tangible object (block 1210). The ARD 14 can then initiate audiovisual augmentation for the recognized item (block 1215). For example, if the recognized item is a doll, the augmentation logic may display a cartoon version of the doll in the AR representation displayed on the on ARD 14. The augmentation logic can also be configured to cause the character to sing a song, talk, move about the AR environment displayed on the ARD 14, or other such behavior.

Voice detection can then be initiated by the augmentation logic to identify a voice command uttered by the user (block 1220). If a voice command is detected (block 1225), the augmentation logic can modify the augmentation for a character to perform an action associated with the command (block 1230). For example, the user in the example illustrated in FIG. 14 may say "Use the potty" and the augmentation logic can be configured to animate the augmented reality representation of the character 31 to use the toilet in the AR representation of the scene provided on the ARD 14. The voice command may also be a response to a question posed by the augmented reality representation of the character 31. For example, the augmented reality representation of the character 31 may ask the user "Should I take a bath?" If the user response with a "yes" the augmentation logic can trigger animate of the augmented reality representation of the character 31 taking a bath in the AR scene. If the user says "no" or does not respond, the augmentation logic may not trigger animate of the augmented reality representation of the character 31 taking a bath in the AR scene since the trigger event has not occurred.

According to aspects of the present disclosure, the ARD 14 may be configured to control a combination of augmented reality, tangible and voice user interface for continued engagement. In one implementation, the ARD 14 may be configured to encourage engagement to help develop verbalization skills. Verbalization can be used as a metric for determining depth of engagement and learning. To reward verbalization and to keep a user engaged, the user's verbalizations can be used to drive a scene. A scene for the purposes of this disclosure is defined as a continuous flow of action within the AR environment displayed on the ARD 14. The augmentation logic can be configured to respond to verbalization to drive a scene in a number of ways. For example, if a user is verbalizing a lot during the current scene, the augmentation logic can be configured to keep the scene on the topic, or extend in its current topic, or stay at the current target level content. If the user is not verbalizing, or reduces verbalization, the augmentation logic can be configured to move the scene on to a new topic or to change target level of the content.

Figure 13:
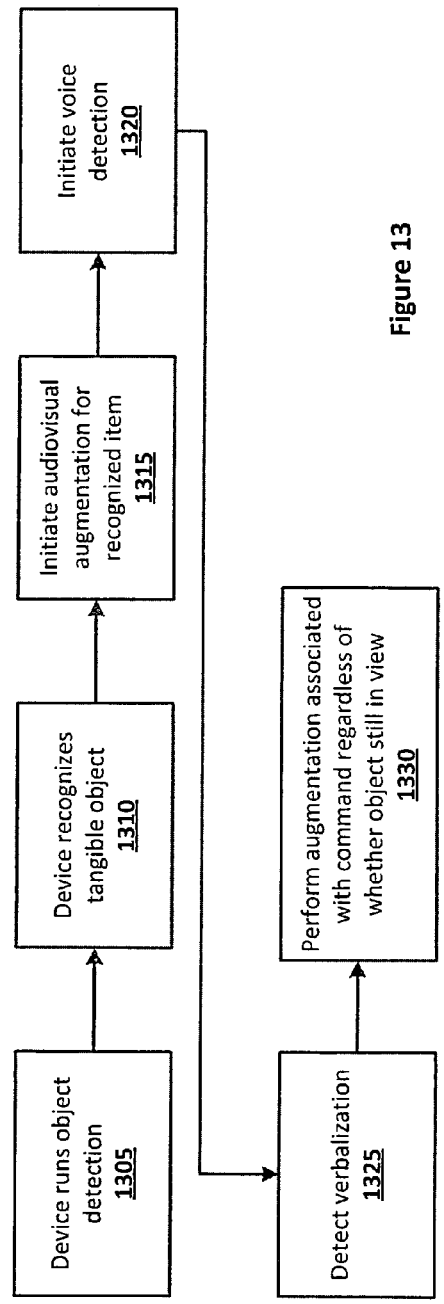
FIG. 13 illustrates a flow diagram of an example method for providing augmented reality on augmented reality enabled device according to some aspects of the present disclosure.

FIG. 13 is a flow diagram of an example method for providing augmented reality on an ARD 14 to provide continued engagement with user. The ARD 14 runs object detection (block 1305). As described above, the ARD 14 includes a camera that can capture images or video of a real-world scene. The ARD 14 can include augmentation logic that can analyze the images or video of the scene to detect objects, such as toys or other real-world items that may be augmented in the view provided by the ARD 14. The augmentation logic of the ARD 14 then recognizes a tangible object (block 1310). The ARD 14 can then initiate audiovisual augmentation for the recognized item (block 1315). For example, if the recognized item is a doll, the augmentation logic may display a cartoon version of the doll in the AR representation displayed on the on ARD 14. The augmentation logic may also be configured to cause the character to sing a song, talk, move about the AR environment displayed on the ARD 14, or other such behavior.

Voice detection can be initiated by the augmentation logic to identify vocalization by the user (block 1320). The voice detection can use audio cancellation filtering to filter out sounds outside of expected frequency ranges for vocalizations to eliminate undesired audio input, such as background noise, that may not be indicative of engagement by the user. In some instances, the voice detection logic can be configured to look for specific vocalizations. For example, specific words or phrases uttered by the user. If vocalization is detected (block 1325), the augmentation logic can be configured to provide audiovisual augmentation of the scene on the ARD 14 (block 1330). The augmentation logic can be configured to continue to provide at least the audio portion of the augmentation regardless of whether or not the augmented reality representation of the character 31 remains in the viewport visible on the display of the ARD 14. For example, the user may be a user and the user may allow the device to move or "drift" off the view of the scene. Such movement may indicate that the user may no longer be engaged in the scene and that the augmentation logic no longer needs to generate the representation of the augmented reality representation of the character 31. However, the augmentation logic can be configured to continue to play the audio portion of the augmentation content associated with the augmented reality representation of the character 31 as long as the user continues to verbalize, because the continued verbalization may indicate that the user may still be engaged in the scene. For example, if a user may sing and dance in response to the augmented reality representation of the character 31 singing a song. The movement of the user may cause the ARD 14 to drift and the toy associated with the augmented reality representation of the character 31 to move out of the view of the camera. The augmentation logic can be configured to continue to play at least the audio portion of the content for augmented reality representation of the character 31, even if the visible representation of the character on the display of the ARD 14 may no longer be visible.

According to aspects of the present disclosure, the ARD 14 may be configured to control a combination of augmented reality, tangible and voice user interface for group play. In one implementation, the ARD 14 may be configured to encourage group play to help develop verbalization skills. Tangible user interfaces invite multi-user interactions and can be used to encourage users to play together. This joint play behavior can stimulate verbalizations between the users playing. The methods encourage co-verbalization by rewarding co-verbalization with focused augmentation.

During group play, the augmentation logic may be configured to determine which user is providing audible input and whether the augmentation logic can respond to that user. In an instance where a single device may be used with multiple users, the augmentation logic may identify the loudest voice detected as being the primary user of the device and respond to audible input received from the primary user in one way while responding to audible input from a secondary user in a different way (if at all). Where multiple ARDs are being used together, the ARDs can be configured to identify when it may proximate to the other ARD 15. In some instances, the ARD 14 may include wireless connectivity, such as WiFi connectivity for connecting to a WLAN connection, and the ARD 14 may detect the proximity of the second ARD 15 using wireless signals transmitted by the second ARD 15.

Figure 14:
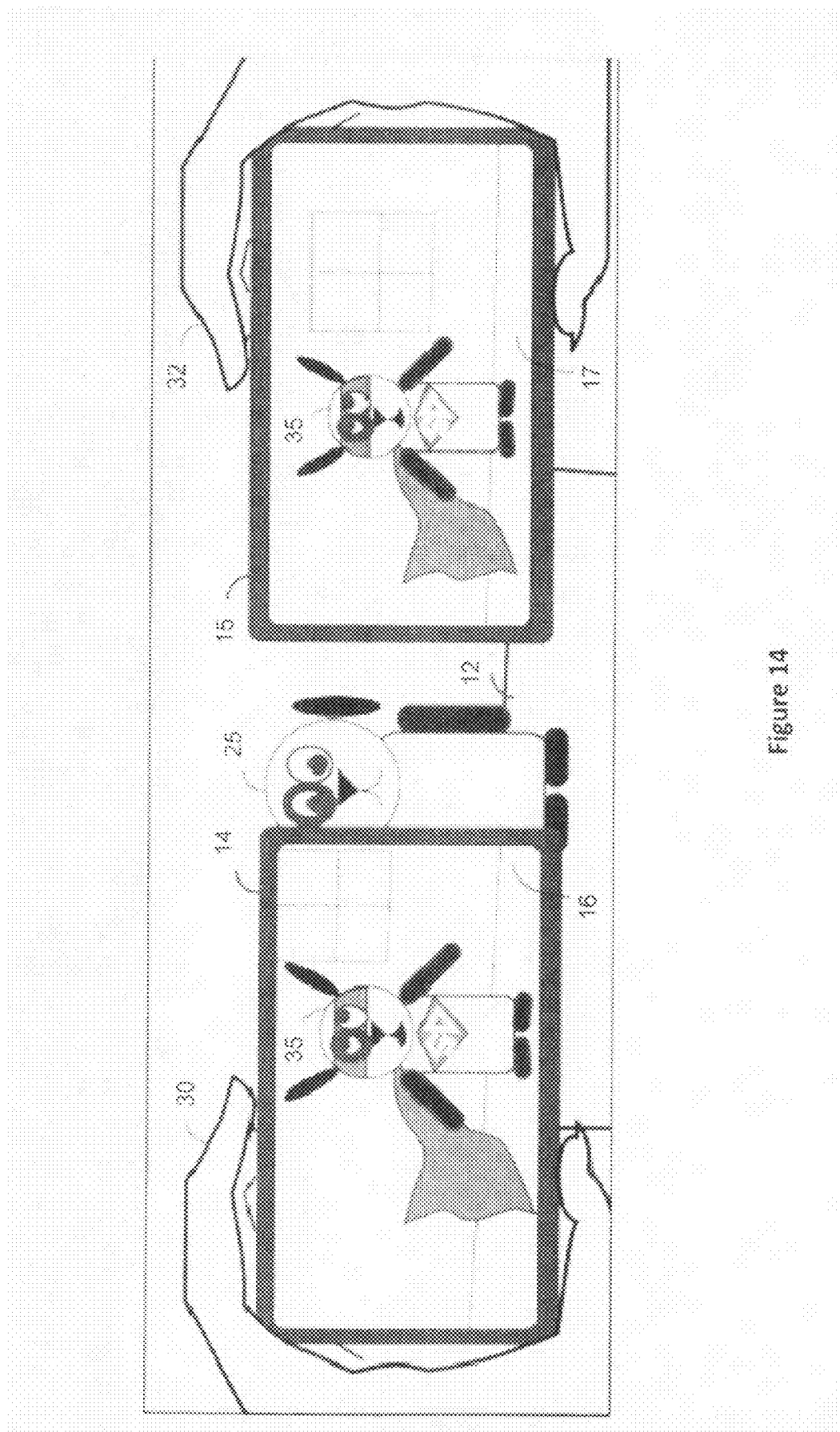
FIG. 14 illustrates a method of providing interactions across multiple augmented reality enabled devices according to some aspects of the present disclosure.

According to aspects of the present disclosure, two users 30 and 32 may share a single ARD 14. In some other aspects of the present disclosure, each user 30 and 32 may have his or her own ARD 14 or 15 as shown in FIG. 14. In both examples, the both users can provide voice commands that can be recognized by the respective ARDs 14 and 15. According to embodiments of the present disclosure, multiple ARDs may be configured to maintain augmentation across the multiple ARDs. As illustrated in FIG. 14, if multiple users with corresponding augmented reality enabled devices are playing with the same play set at or near the same time, certain augmentation elements can remain substantially the same across the multiple ARDs, while others augmentation elements may differ.

In one exemplary implementation, if a user 30 turns Dog 25 into Super Dog 35, another user 32 on another ARD 15 may see Dog 25 as Super Dog 35 as well in their respective augmentations 16 and 17. Note that the sound augmentation from each ARD may be related to the play the particular ARD may be pointing at.

The augmentation logic of the ARD 14 can be configured to identify a primary user of the device. Where a single ARD 14 is being used by multiple users, the ARD 14 can identify a primary user of the device and give priority to voice commands and/or verbalizations provided by the primary user. For example, if no primary user is currently associated with the ARD 14, the ARD 14 can be configured to select a user that is loudest as the primary user of the device, as this user may likely to be the user who is closest to the device. After a user's voice has been associated with the ARD 14, the ARD 14 can be configured to continue to recognize that voice as the primary user. The augmentation logic of the ARD 14 can be configured to provide dominant focus on vocalizations from the primary user and secondarily focus on vocalizations from other users. With this approach, the augmentation logic can resolve conflicting inputs from the users in favor of the primary user of the device.

Where multiple ARDs 14 and 15 are being used by multiple users (30 and 32), such as in FIG. 14, each ARD 14 or 15 can identify a primary user of that device and give priority to voice commands and/or verbalizations provided by the primary user. As described above, if no primary user is currently associated with an ARD 14 or 15, the ARD 14 or 15 can be configured to select a user that is loudest as the primary user of the device, as this user may likely to be the user who is closest to the device. Where two or more ARDs 14 and 15 are within close proximity to one another, the augmentation logic can be configured to determine whether the ARDs are being used in the same scene. For example, the proximity of the ARDs to one another and the orientation of the ARDs can be considered when determining whether the ARDs are being used with the same scene. Where a reference background 12 or other tangible target items may be used to define a "room," the augmentation logic can be configured to share information with the augmentation logic of another ARD to determine whether both users may be taking part in the same scene. If ARDs are being used in different scenes, then the augmentation logic can be configured to identify a primary user for the device and to respond to that user. If both ARDs are being used in the same scene or one of the devices may not be focused on a scene (e.g. the device may have been put down by the user), the voices may be considered in tandem, and a primary user of the device may be selected. The ARDs (14 and 15) can be configured to communicate using peer-to-peer communication. For example, the ARDs can be configured to communicate using Bluetooth, Wi-Fi, or other wireless protocols. In some implementations, the ARDs (14 and 15) can be configured to communicate with a wireless access point or wireless base station and messages between the devices can be routed to one another through an intermediary server. The messages exchanged between the ARDs can include the pose of each object relative to a target and voice commands received by each device so that the augmentation content displayed by the two or more devices can be synchronized.

The augmentation logic can be configured to engage with multiple users. For example, if a first user mentions soccer and a second user mentions dogs, the augmentation logic may integrate both soccer and dogs into the scene. The augmentation logic may be configured to animate a character in the scene to say "I like dogs and soccer."

The augmentation logic can also be configured to encourage each user to participate and vocalize. If one voice is heard much more than another, the augmentation logic may prompt for a response from the second user. For example, the augmentation logic may be configured to animate a character in the scene to say "And, how about you? What do you like?"

The augmentation logic can also be configured to mitigate or avoid confrontation between users. For example, if argumentative tones or abusive words are detected from one or more voices, the augmentation logic can be configured to respond accordingly. For example, the augmentation logic can be configured to animate the augmented reality representation of the character 31 to prompt the user or users to correct their attitude or to introduce a new topic. For example, the character may exclaim, "Hey! You know what I really love? Ice cream!" and commences singing a song or the character may exclaims "Hey now you all!" and sing a song about playing nicely together.

The augmentation logic can be configured to handle conflicting commands given by different users during group play. For example, if two users are sharing the same ARD 14 and conflicting commands, such as user 1 says "Bernie play soccer" and user 2 says "Bernie take a nap" are received, the augmentation logic can resolve the conflict. The augmentation logic can be configured to prioritize the commands given by one user over the other (e.g. first come-first served). The augmentation logic can be configured to ignore one of the commands or to perform the commands sequentially. In implementations where each user has an ARD 14 or multiple ARDs are being used, the augmentation logic can be configured to resolve the conflicts in a similar fashion as with a single user device.

Figure 15:
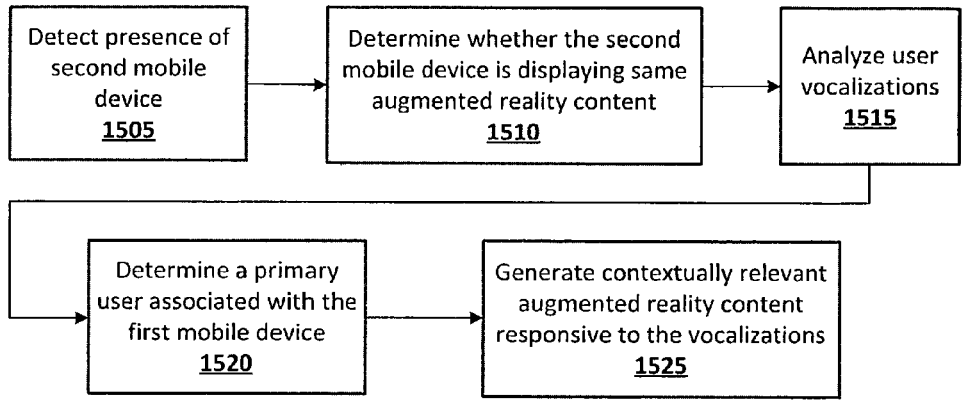
FIG. 15 illustrates a flow diagram of an example method for providing augmented reality on augmented reality enabled device or devices to multiple users according to some aspects of the present disclosure.

FIG. 15 is flow diagram of an example method for providing augmented reality on an ARD 14 or devices to multiple users. The presence of a second ARD 15 can be detected at a first ARD 14 (block 1505). Responsive to detecting that the second ARD 15 is proximate to the first ARD 14, the first ARD 14 can determine whether the second ARD 15 is displaying augmented reality content associated with augmented reality content being displayed by the first ARD 14 (block 1510). The vocalizations of a plurality of users can be analyzed at the first ARD 14 (block 1515), and a primary user of the first ARD 14 can be determined based on the vocalizations (block 1520). The first ARD 14 can then customize the augmented reality content provided by that device to provide contextually relevant content responsive to the vocalizations. The first ARD 14 can give more weight to vocalizations provided by the primary user than vocalizations provided by other users when selecting contextually relevant content to provide to the users (block 1525).

Figure 16:
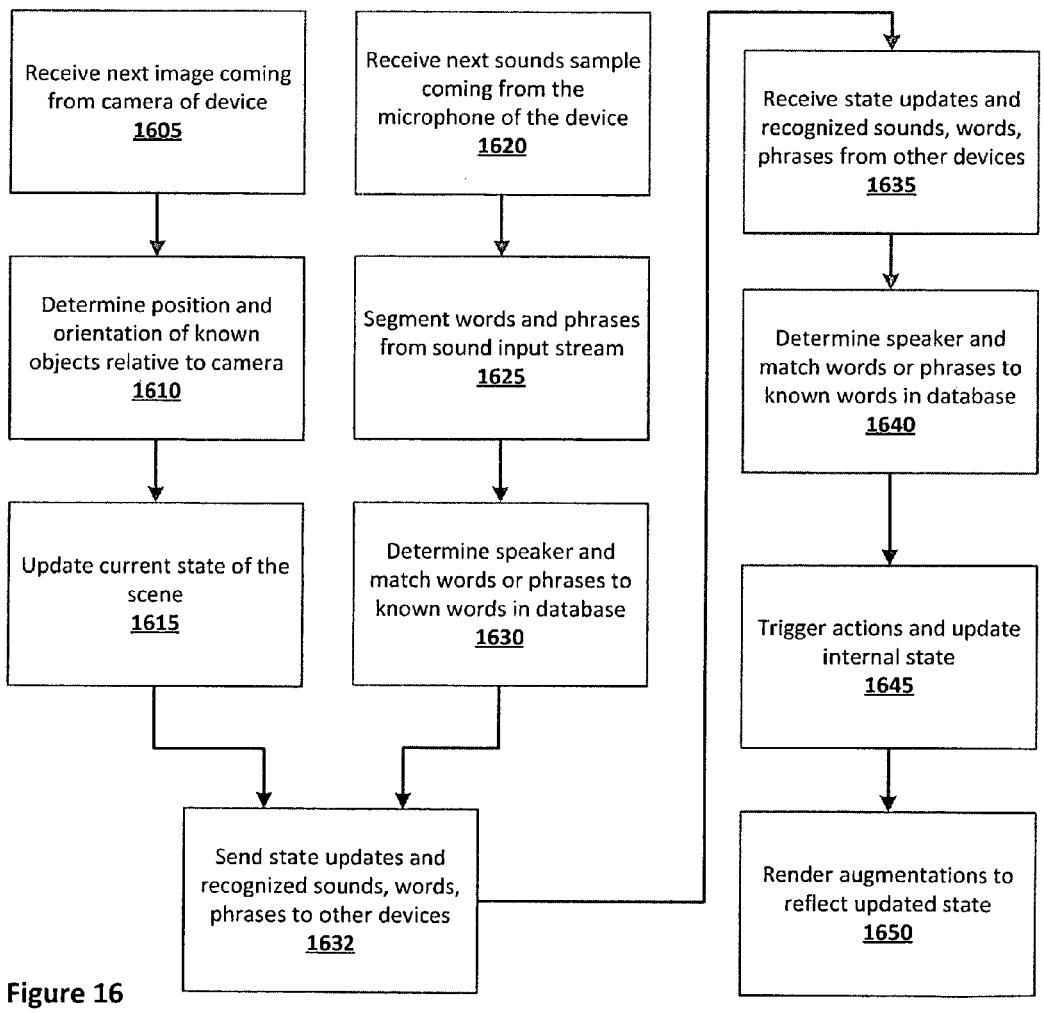
FIG. 16 illustrates a flow diagram of an example method for providing augmented reality content on multiple augmented reality enabled devices according to some aspects of the present disclosure.

FIG. 16 is a flow diagram of an example method for providing augmented reality content on multiple ARDs. The method illustrated in FIG. 16 can be used to implement augmentation logic where multiple ARDs are being used together. The method can be implemented in the augmentation logic of the ARD 14. Alternatively, some or all of the blocks may be implemented by a server. The method includes receiving a next image from the camera of the ARD 14 (block 1605), and determining a position and orientation of known objects relative to the camera (block 1610). As described above, the augmentation logic can be configured to identify tangible, real-world objects within the field of view of the camera using various techniques. The current state of the scene can then be updated (block 1615). The augmentation logic can maintain information about the current state of a scene, such as the position and orientation of objects within the scene. If one or more objects are moved, the information about the current state of the scene can be updated to reflect these changes. The method also includes a second branch that may be executed substantially in parallel with the first branch of the method (blocks 1605, 1610, and 1615). The blocks included in the second branch of the method may also be performed sequentially before, after, or intermixed with the blocks included in the first branch of the method. The second branch may include receiving a next sound sample coming from the microphone of the ARD 14 (block 1620). The sound input stream can then be segmented into individual sounds, words, and/or phrases (block 1625). A speaker associated with words or phrases can be identified and words or phrases can be matched to a dictionary of known words or phrases in a database (block 1630). If the speaker has been previously identified, the information regarding the scene can be updated to associate the new vocalizations received from that user. If the speaker has not been previously identified, the augmentation logic can begin tracking vocalizations received from that user.

Information regarding state updates for the scene and recognized words, phrases and/or sound can then be sent to other ARDs that may proximate to the ARD 14 (block 1632). The augmentation logic of the ARD 14 or the other ARD 15 can also be configured to make a determination whether the two or more devices are being used to interact with the same scene and to not share or discard received information about the state of a scene if the devices are not displaying the same scene. Information regarding state updates and recognized sounds, words, and/or phrases can also be received from other ARDs (block 1635). The speaker associated with the words or phrases can be identified in the content received from the other ARDs and matches to known words and/or phrases in the database can be made (block 1640). The augmentation logic can then trigger actions based on updates made to the information representing the state of the scene (block 1645) and render augmentations to reflect the updated state of the scene (block 1650).

Figure 17:
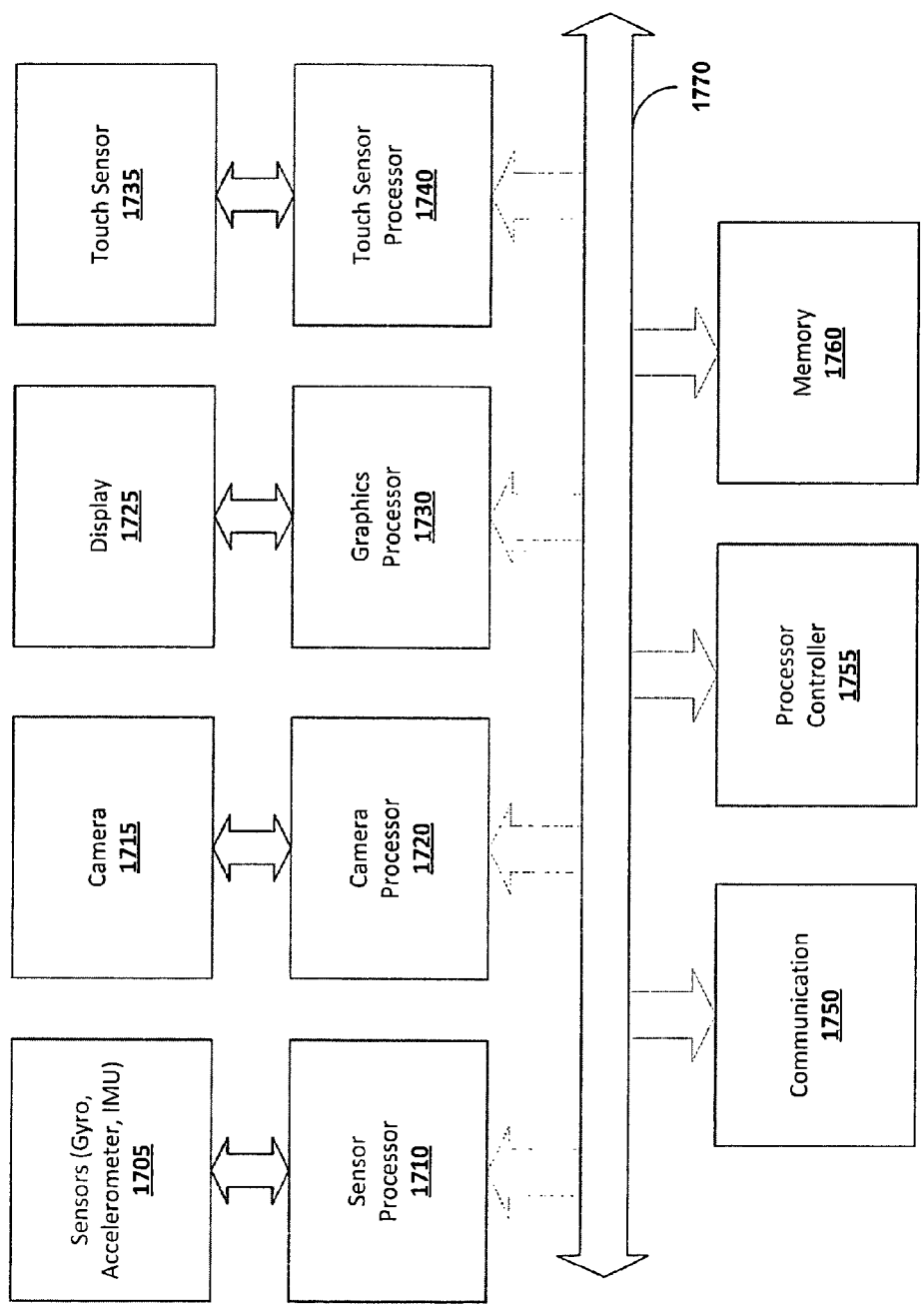
FIG. 17 illustrates an example of a device that can be used to implement the augmented reality enabled techniques according to some aspects of the present disclosure.

FIG. 17 illustrates another implementation of the ARD described herein. According to aspects of the present disclosure, the ARD 14 includes sensors 1705 (e.g. gyros, accelerometers, an inertial measurement unit (IMU) and/or other types of sensors) and a sensor processor 1710 for processing data collected by the sensors 1705. The ARD 14 also includes a camera 1715 and a camera processor 1720. The camera 1715 can be configured to capture images and/or video of a real-world scene that can be augmented using the augmentation logic described above. The camera processor 1720 can be configured to process the data collected by the camera 1720 and to convert the data collected by the camera into a format that can be used by the augmentation logic. The camera processor 1720 can be configured to perform various types of image or video processing on the data collected from the camera to prepare the content for display on display 1725.

The display 1725 can be touch screen interface that includes touch sensor 1735. The graphics processor 1730 can be used to generate graphical data for display on display 1725. The augmentation logic can be configured to send commands to the graphics processor 1730 to display augmented image or video content. Touch sensor processor 1740 can process data output by the touch sensor 1735 to identify when a user touches the touch screen. The touch sensor processor 1740 can be configured to identify various touch gestures, including multi-finger touches of the touch screen. The augmentation logic can use the gesture information determined by the touch sensor processor 1740 to determine, at least in part, how the augmentation should react in response to user input. The communications controller 1750 can be configured to enable the device to communication using one more wireless protocols. The communications controller 1750 can be configured to allow the device to send and receive data from nearby wireless devices, including wireless access point and other ARDs. The memory 1760 may include volatile and/or persistent memory for storing data used by various components of the ARD 14. The memory 1760 can be used to store processor-executable program code for one or more of the processors included in the device. In some instances, the augmentation logic can be implemented as processor-executable instructions stored in the memory 1760. The processor controller 1755 can be configured to control one or more of the sensor processor 1710, camera processor 1720, the graphics processor 1730, and the touch sensor processor 1740. One or more of the sensor processor 1710, camera processor 1720, the graphics processor 1730, and the touch sensor processor 1740 may also be implemented by the controller processor 1755. The blocks of the ARD 14 as described in FIG. 17 may communicate with each other via a system bus 1770.

According to aspects of the present disclosure, identifying and tracking features in image frames may be performed using a number of techniques. In one approach, a method of identifying features may be performed by examining the minimum eigenvalue of each 2 by 2 gradient matrix. Then the features are tracked using a Newton-Raphson method of minimizing the difference between the two windows. The method of multi-resolution tracking allows for relatively large displacements between images. Note that during tracking of features from one frame to the next frame, errors may accumulate. To detect potentially bad features, the mobile device may be configured to monitor whether the image signal in the window around the feature in the current frame is still similar to the image signal around the feature in the previous frame. Since features may be tracked over many frames, the image content may be deformed. To address this issue, consistency check may be performed with a similarity or an affine mapping.

According to aspects of the present disclosure, to identify an object in an image, points on the object may be extracted to provide feature descriptions (also referred to as keypoints, feature points or features for short) of the object. This description, extracted from a training image, may then be used to identify the object when attempting to locate the object in a test image containing many other objects. To perform reliable recognition, the features extracted from the training image may be detectable even under changes in image scale, noise and illumination. Such points usually lie on high-contrast regions of the image, such as object edges.

Another characteristic of these features is that the relative positions between them in the original scene may not change from one image to another. For example, if only the four corners of a door are used as features, they may work regardless of the door's position; but if points in the frame are used, the recognition may fail if the door is opened or closed. Similarly, features located in articulated or flexible objects may typically not work if any change in their internal geometry happens between two images in the set being processed. In some implementations, SIFT detects and uses a larger number of features from the images, which can reduce the contribution of the errors caused by the local variations in the average error of all feature matching errors. Thus, the disclosed method may identify objects even among clutter and under partial occlusion; because the SIFT feature descriptor can be invariant to uniform scaling, orientation, and partially invariant to affine distortion and illumination changes.

For example, keypoints of an object may first be extracted from a set of reference images and stored in a database. An object is recognized in a new image by comparing each feature from the new image to this database and finding candidate matching features based on Euclidean distance of their feature vectors. From the full set of matches, subsets of keypoints that agree on the object and its location, scale, and orientation in the new image may be identified to filter out good matches. The determination of consistent clusters may be performed by using a hash table implementation of a generalized Hough transform. Each cluster of 3 or more features that agree on an object and its pose may then be subject to further detailed model verification and subsequently outliers may be discarded. The probability that a particular set of features indicates the presence of an object may then be computed based on the accuracy of fit and number of probable false matches. Object matches that pass the tests can be identified as correct with high confidence.

According to aspects of the present disclosure, image feature generation transforms an image into a large collection of feature vectors, each of which may be invariant to image translation, scaling, and rotation, as well as invariant to illumination changes and robust to local geometric distortion. These features share similar properties with neurons in inferior temporal cortex that are used for object recognition in primate vision. Key locations may be defined as maxima and minima of the result of difference of Gaussians function applied in scale space to a series of smoothed and resampled images. Low contrast candidate points and edge response points along an edge may be discarded. Dominant orientations are assigned to localized keypoints. This approach ensures that the keypoints are more stable for matching and recognition. SIFT descriptors robust to local affine distortion may then be obtained by considering pixels around a radius of the key location, blurring and resampling of local image orientation planes.

Features matching and indexing may include storing SIFT keys and identifying matching keys from the new image. In one approach, a modification of the k-d tree algorithm which is also referred to as the best-bin-first search method that may be used to identify the nearest neighbors with high probability using a limited amount of computation. The best-bin-first algorithm uses a modified search ordering for the k-d tree algorithm so that bins in feature space may be searched in the order of their closest distance from the query location. This search order requires the use of a heap-based priority queue for efficient determination of the search order. The best candidate match for each keypoint may be found by identifying its nearest neighbor in the database of keypoints from training images. The nearest neighbors can be defined as the keypoints with minimum Euclidean distance from the given descriptor vector. The probability that a match is correct can be determined by taking the ratio of distance from the closest neighbor to the distance of the second closest.

In one exemplary implementation, matches in which the distance ratio is greater than 0.8 may be rejected, which eliminates 90% of the false matches while discarding less than 5% of the correct matches. To further improve the efficiency of the best-bin-first algorithm, search may be cut off after checking a predetermined number (for example 100) nearest neighbor candidates. For a database of 100,000 keypoints, this may provide a speedup over exact nearest neighbor search by about 2 orders of magnitude, yet results in less than a 5% loss in the number of correct matches.

Note that with the exemplary implementation, the Hough Transform may be used to cluster reliable model hypotheses to search for keys that agree upon a particular model pose. Hough transform may be used to identify clusters of features with a consistent interpretation by using each feature to vote for object poses that may be consistent with the feature. When clusters of features are found to vote for the same pose of an object, the probability of the interpretation being correct may be higher than for any single feature. An entry in a hash table may be created to predict the model location, orientation, and scale from the match hypothesis. The hash table can be searched to identify clusters of at least 3 entries in a bin, and the bins may be sorted into decreasing order of size.

According to aspects of the present disclosure, each of the SIFT keypoints may specify 2D location, scale, and orientation. In addition, each matched keypoint in the database may have a record of its parameters relative to the training image in which it is found. The similarity transform implied by these 4 parameters may be an approximation to the 6 degree-of-freedom pose space for a 3D object and also does not account for any non-rigid deformations. Therefore, an exemplary implementation may use broad bin sizes of 30 degrees for orientation, a factor of 2 for scale, and 0.25 times the maximum projected training image dimension (using the predicted scale) for location. The SIFT key samples generated at the larger scale may be given twice the weight of those at the smaller scale. With this approach, the larger scale may in effect able to filter the most likely neighbors for checking at the smaller scale. This approach also improves recognition performance by giving more weight to the least-noisy scale. According to aspects of the present disclosure, to avoid the issue of boundary effects in bin assignment, each keypoint match may vote for the 2 closest bins in each dimension, giving a total of 16 entries for each hypothesis and further broadening the pose range.

According to aspects of the present disclosure, outliers may be removed by checking for agreement between each image feature and the model, for a given parameter solution. For example, given a linear least squares solution, each match may be required to agree within half the error range that is used for the parameters in the Hough transform bins. As outliers are discarded, the linear least squares solution may be resolved with the remaining points, and the process may be iterated. In some implementations, if less than a predetermined number of points (e.g. 3 points) remain after discarding outliers, the match may be rejected. In addition, a top-down matching phase may be used to add any further matches that agree with the projected model position, which may have been missed from the Hough transform bin due to the similarity transform approximation or other errors.

The decision to accept or reject a model hypothesis can be based on a detailed probabilistic model. The method first computes an expected number of false matches to the model pose, given the projected size of the model, the number of features within the region, and the accuracy of the fit. A Bayesian probability analysis can then give the probability that the object may be present based on the actual number of matching features found. A model may be accepted if the final probability for a correct interpretation is greater than a predetermined percentage (for example 95%).

According to aspects of the present disclosure, in one approach, rotation invariant feature transform (RIFT) method may be employed as a rotation-invariant generalization of SIFT to address under clutter or partial occlusion situations. The RIFT descriptor may be constructed using circular normalized patches divided into concentric rings of equal width and within each ring a gradient orientation histogram may be computed. To maintain rotation invariance, the orientation may be measured at each point relative to the direction pointing outward from the center.

In another approach, a generalized robust invariant feature (G-RIF) method may be used. The G-RIF encodes edge orientation, edge density and hue information in a unified form combining perceptual information with spatial encoding. The object recognition scheme uses neighboring context based voting to estimate object models.

In yet another approach, a speeded up robust feature (SURF) method may be used which uses a scale and rotation-invariant interest point detector/descriptor that can outperform previously proposed schemes with respect to repeatability, distinctiveness, and robustness. SURF relies on integral images for image convolutions to reduce computation time, and builds on the strengths of the leading existing detectors and descriptors (using a fast Hessian matrix-based measure for the detector and a distribution-based descriptor). The SURF method describes a distribution of Haar wavelet responses within the interest point neighborhood. Integral images may be used for speed, and 64 dimensions may be used to reduce the time for feature computation and matching. The indexing step may be based on the sign of the Laplacian, which increases the matching speed and the robustness of the descriptor.

In yet another approach, the principle component analysis SIFT (PCA-SIFT) method may be used: In some implementations, the PCA-SIFT descriptor is a vector of image gradients in x and y direction computed within the support region. The gradient region can be sampled at 39×39 locations. Thus, the vector can be of dimension 3042. The dimension can be reduced to 36 with PCA. In yet another approach, the Gradient location-orientation histogram (GLOH) method can be employed, which is an extension of the SIFT descriptor designed to increase its robustness and distinctiveness. In some implementations, the SIFT descriptor can be computed for a log-polar location grid with three bins in radial direction (the radius set to 6, 11, and 15) and 8 in angular direction, which results in 17 location bins. The central bin may not be divided in angular directions. The gradient orientations may be quantized in 16 bins resulting in 272 bin histogram. The size of this descriptor can be reduced with PCA. The covariance matrix for PCA can be estimated on image patches collected from various images. The 128 largest eigenvectors may then be used for description.

In yet another approach, a two-object recognition algorithm may be employed to use with the limitations of current mobile devices. In contrast to the classic SIFT approach, the Features from Accelerated Segment Test (FAST) corner detector can be used for feature detection. This approach distinguishes between the off-line preparation phase where features may be created at different scale levels and the on-line phase where features may be created at a current fixed scale level of the mobile device's camera image. In one exemplary implementation, features may be created from a predetermined fixed patch size (for example 15×15 pixels) and form a SIFT descriptor with 36 dimensions. The approach can be further extended by integrating a scalable vocabulary tree in the recognition pipeline. This allows an efficient recognition of a larger number of objects on mobile devices.

According to aspects of the present disclosure, the detection and description of local image features can help in object recognition. The SIFT features can be local and based on the appearance of the object at particular interest points, and may be invariant to image scale and rotation. They may also be robust to changes in illumination, noise, and minor changes in viewpoint. In addition to these properties, the features may be highly distinctive, relatively easy to extract and allow for correct object identification with low probability of mismatch. The features can be relatively easy to match against a (large) database of local features, and generally probabilistic algorithms such as k-dimensional (k-d) trees with best-bin-first search may be used. Object descriptions by a set of SIFT features may also be robust to partial occlusion. For example, as few as 3 SIFT features from an object may be sufficient to compute its location and pose. In some implementations, recognition may be performed in quasi real time, for small databases and on modern computer hardware.

According to aspects of the present disclosure, the random sample consensus (RANSAC) technique may be employed to remove outliers caused by moving objects in view of the camera. Note that the RANSAC uses an iterative method to estimate parameters of a mathematical model from a set of observed data which contains outliers. This method can be a non-deterministic as it produces a reasonable result with an associated probability, where the probability may increase as more iteration is performed.

In one exemplary implementation, a set of observed data values, a parameterized model which can be fitted to the observations with corresponding confidence parameters. In this exemplary implementation, the method iteratively selects a random subset of the original data. These data can be hypothetical inliers and the hypothesis may then be tested as follows:

1. A model can be fitted to the hypothetical inliers, i.e. all free parameters of the model are reconstructed from the inliers.
2. All other data can then be tested against the fitted model and, if a point fits well to the estimated model; it can be considered as a hypothetical inlier.
3. The estimated model can be considered acceptable if sufficiently number of points have been classified as hypothetical inliers.
4. The model can be re-estimated from all hypothetical inliers, because it has only been estimated from the initial set of hypothetical inliers.
5. Finally, the model can be evaluated by estimating the error of the inliers relative to the model.

The above procedure can be repeated for a predetermined number of times, each time producing either a model which may be rejected because too few points are classified as inliers or a refined model together with a corresponding error measure. In the latter case, the refined model can be kept if the error is lower than the previously saved model.

In another exemplary implementation, moving objects in view of the camera can be actively identified and removed using a model based motion tracking method. In one approach, the objective of tracking can be treated as a problem of model recognition. A binary representation of the target can be tracked, and a Hausdorff distance based search can be used to search regions of the image for the object. For a binary representation of the target (a model), output from the standard canny edge detector of the Gaussian smoothed image can be augmented with the notion of a model history. At each frame, a Hausdorff search can be performed on each target, using the canny edges from the current image and the current model. In addition, an affine estimation may be performed to approximate the net background motion. From the results of these two searches, information can be gathered about the target, and be used to approximate the motion of the target, as well as separate the background from motion in the region of the target. To be able to handle hazard/unusual conditions (such as the object becoming occluded going into a shadow, the object leaving the frame, or camera image distortion providing bad image quality), history data about the target may be retained, such as the target's past motion and size change, characteristic views of the target (snapshots throughout time that provide an accurate representation of the different ways the target has been tracked), and match qualities in the past.

The history of tracking the target can be useful in more than just aiding hazard/unusual conditions; that part of a solid motion tracking method can involve history data, and not just a frame by frame method of motion comparison. This history state can provide information regarding how to decide what should be considered part of the target (e.g. things moving close to the object moving at the same speed should be incorporated into the object), and with information about motion and size, the method can predictively estimate where a lost object may have gone, or where it may reappear (which has been useful in recovering targets that leave the frame and reappear later in time).

An inherent challenge in the motion tracking method may be caused by the fact that the camera can have an arbitrary movement (as opposed to a stationary camera), which makes developing a tracking system that can handle unpredictable changes in camera motion difficult. A computationally efficient affine background estimation scheme may be used to provide information as to the motion of the camera and scene.

According to aspects of the present disclosure, an affine transformation for the image can be performed at time t to the image at time t+dt, which allows correlating the motion in the two images. This background information allows the method to synthesize an image at time t+dt from the image at time t and the affine transform that can be an approximation of the net scene motion. This synthesized image can be useful in generating new model information and removing background clutter from the model space, because a difference of the actual image at t+dt and the generated image at t+dt can be taken to remove image features from the space surrounding targets.

In addition to the use of the affine transform as a tool to clean-up the search space, it can also be used to normalize the coordinate movement of the targets: by having a vector to track how the background may be moving, and a vector to track how the target may be moving, a difference of the two vector may be taken to generate a vector that describes the motion of the target with respect to the background. This vector allows the method to predictively match where the target should be, and anticipate hazard conditions (for example looking ahead in the direction of the motion can provide clues about upcoming obstacles, as well as keeping track of where the object may be in case of a hazard condition. When an object enters a hazard condition, the method may still be able to estimate the background motion, and use that coupled with the knowledge of the model's previous movements to guess where the model may reappear, or re-enter the frame.

The background estimation can be a key factor in the prolonged tracking of objects. Note that short term tracking may be performed without background estimation, but after a period of time, object distortion and hazards may be difficult to cope with effectively without a good estimation of the background.

According to aspects of the present disclosure, one of the advantages of using the Hausdorff distance as a matching operator is that it can be quite tolerant of changes in shape during matching, but using the Hausdorff distance as a matching operator may require the objects being tracked be more accurately defined.

In one approach, straight dilation-based methods of grabbing a new model from the time t+1 image can be used. Note that in some situations where there can be non-object features close to the object (which occurs quite often), the dilation method may not be effective because it may slowly incorporate the entire scene into the model. Thus, a method of updating the model from frame to frame that can be tolerant to changes in the model shape, but not so relaxed that causing incorporating non-model pixels into the model may be adopted. One exemplary implementation is to use a combination of background removal and adding the previous models to the current model match window and taking what seems to be stable pixels, as well as the new ones surrounding them, which over time may either get eliminated from the model because they may not be stable, or get incorporated into the model. This approach can be effective in keeping the models relatively clean from clutter in the image. For example, with this approach, no longer does a road close to a truck get pulled into the model pixel by pixel. Note that the models may appear to be dilated, but this may be a result of the history effect of how the models are constructed; but it may also have the feature of making the search results more definite because this method can have more model pixels to possibly match in the next frame.

Note that at each frame, there may be a significant amount of computation to be performed. According to some implementations, the mobile device can be configured to perform smoothing/feature extraction, Hausdorff matching each target (for example one match per model), as well as affine background estimation. Each of these operations can be quite computationally expensive individually. In order to achieve real-time performance on a mobile device, the design can be configured to use as much parallelism as possible.

According to an embodiment of the present disclosure, a method for providing augmented reality on a mobile device comprises detecting a tangible, real-world object within the field of view of a camera oldie mobile device, providing an augmented reality object corresponding to the tangible, real-world object, where animating the augmented reality object includes providing an interactive display component on a display of the mobile device and an interactive audio component via an audio output of the mobile device, analyzing vocalizations of the user of the device to determine a response to the user vocalizations, and modifying the augmented reality object responsive to the vocalizations to provide the response to the user vocalizations.

According to another embodiment of the present disclosure, a method for providing augmented reality on a mobile device comprises detecting a tangible, real-world object within the field of view of a camera of the mobile device, providing an augmented reality object corresponding to the tangible, real-world object, where providing the augmented reality object includes providing an interactive display component on a display of the mobile device and an interactive audio component via an audio output of the mobile device, tracking movement of the device relative to the tangible, real-world object, determining whether the tangible, real-world object is still within the field of view of the camera, analyzing vocalizations of the user of the device to assess a level of engagement of the user in response to the tangible, real-world object no longer being within the field of view of the camera, and providing the interactive audio component associated with the augmented reality object if the level of engagement exceeds a predetermined threshold while no longer providing the display component on the display of the mobile device. Note that the mobile device may be a mobile phone or a tablet computer.

According to yet another embodiment of the present disclosure, a method for providing augmented reality on a mobile device comprises detecting a tangible, real-world object within the field of view of a camera of the mobile device, providing an augmented reality object corresponding to the tangible, real-world object, where animating the augmented reality object includes providing an interactive display component on a display of the mobile device and an interactive audio component via an audio output of the mobile device associated with a first topic, analyzing vocalizations of the user of the device to assess a level of engagement of the user, and providing additional interactive content associated with the first topic responsive to the level of engagement of the user exceeding a predetermined threshold. The method further comprises animating the augmented reality object to provide interactive content associated with second topic responsive to the level of engagement of the user not exceeding the predetermined threshold.

According to yet another embodiment of the present disclosure a method for providing augmented reality on a mobile device comprises detecting a tangible, real-world object within the field of view of a camera of the mobile device, animating an augmented reality object corresponding to the tangible, real-world object, where animating the augmented reality object includes providing an interactive display component on a display of the mobile device and an interactive audio component via an audio output of the mobile device associated with a first topic, analyzing vocalizations of a plurality of users interacting with the augmented reality object, determining a primary user associated with the mobile device from the plurality of users based on the vocalizations, and animating the augmented reality object to provide contextually relevant content responsive to the vocalizations, where vocalizations provided by the primary user given more weight than vocalizations provided by other users when selecting contextually relevant content. The method of determining a primary user associated with the mobile device includes analyzing the vocalizations of the plurality of users to identify a user having loudest vocalizations, and associating the user having the loudest vocalizations with the mobile device.

According to yet another embodiment of the present disclosure, a method for providing a shared augmented reality experience on mobile devices comprises detecting at a first mobile device the presence of a second mobile device proximate to the first mobile device, responsive to detecting the second mobile device is proximate to the first mobile device, determining whether the second mobile device is displaying augmented reality content associated with augmented reality content being displayed by the first mobile device, analyzing vocalizations of a plurality of users, determining a primary user associated with the first mobile device based on the vocalizations, and customizing the augmented reality content to provide contextually relevant content responsive to the vocalizations, where vocalizations provided by the primary user given more weight than vocalizations provided by other users when customizing the augmented reality content.

Note that at least the following three paragraphs, FIGS. 1-2, FIG. 6 and their corresponding descriptions provide means for receiving image data for tracking a plurality of objects, means for identifying an object to be selected from the plurality of objects, means for determining whether the object has been selected based at least in part on a set of selection criteria, and means for causing an augmentation to be rendered with the object if it is determined that the object has been selected.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or More instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method for use with an augmented reality enabled device (ARD), comprising:
   receiving image data for tracking a plurality of objects;
   identifying an object to be selected from the plurality of objects;
   determining whether the object has been selected based at least in part on a set of selection criteria, wherein the set of criteria is based at least in part on user's capability in handling the ARD and wherein the user's capability includes developmental state and health condition of the user, wherein determining whether the object has been selected includes determining an adjustable degree of stillness of the ARD with respect to the object to be selected, an adjustable time of hold of the ARD with respect to the object to be selected, and an adjustable tolerance of temporary loss of target by the ARD with respect to the object to be selected, based at least in part on the development state and health condition of the user; and
   causing an augmentation to be rendered with the object if it is determined that the object has been selected.

2. The method of claim 1, wherein the tracking comprises 3-dimensional tracking comprising:
   determining relative poses of the plurality of objects with respect to the ARD; and
   updating states of the plurality of objects using the relative poses of the plurality of objects with respect to the ARD, wherein the states of the plurality of objects include relational information of the plurality of objects.

3. The method of claim 2, wherein the determining relative poses of the plurality of objects with respect to the ARD comprises:
   detecting poses of the plurality of objects with respect to previously received image data of the plurality of objects.

4. The method of claim 2, wherein the relational information comprises:
   relationships among the plurality of objects in a game;
   relationships among the plurality of objects in a story;
   relationships between the plurality of objects with respect to a background; or some combination thereof.

5. The method of claim 1, wherein identifying an object to be selected comprises:
   analyzing the plurality of objects using the image data; and
   identifying the object being closest to a center of an image represented by the image data.

6. The method of claim 1, wherein identifying an object to be selected further comprises:
   causing the plurality of objects in the image data to be rendered on a display of the ARD; and
   identifying the object that covers most of center pixels of the display of the ARD.

7. The method of claim 1, wherein determining whether the object has been selected further comprises:
   measuring relative velocity between the object and the ARD; and
   measuring amount of time the object is stationary with respect to the ARD.

8. The method of claim 1, wherein determining whether the object has been selected further comprises:
   receiving an audio command; and
   measuring amplitude of the audio command.

9. The method of claim 1, wherein the set of selection criteria comprises:
   the object being in view of the ARD for a predetermined period of time;
   the object being in view of the ARD and a relative velocity between the object and the ARD being below a predetermined threshold;
   the object being in view of the ARD and amplitude of an audio command exceeding a predetermined value; or some combination thereof.

10. The method of claim 1, wherein causing the augmentation to be rendered comprises:
    presenting interactions between the object and the ARD in a display of the ARD.

11. The method of claim 1, wherein the identifying comprises determining that the object has been zoomed in on.

12. The method of claim 1, wherein the determining comprises:
    causing an indicator to be presented, wherein the indicator indicating that the object has been identified; and
    determining whether the object is deselected in response to presentation of the indicator.

13. The method of claim 12, wherein determining whether the object is deselected comprises:
    determining that the object has been selected if a position of the object with respect to the ARD is maintained for a threshold amount of time after presentation of the indicator.

14. The method of claim 12, wherein the indicator comprises:
    an icon;
    a vibration of the object on a display of the ARD;
    a vibration of the ARD when the object is centered on the display of the ARD;
    a representation of an elapsed time; or some combination thereof.

15. The method of claim 1, further comprising:
causing an image of a scene to be displayed on a display of the ARD, the scene including one or more objects;
causing the image to be augmented with an indicator identifying an object of to be selected from the plurality of objects; and
determining whether the object has been deselected subsequent to the image being augmented with the indicator.

16. An augmented reality enabled device (ARD), comprising:
a camera configured to receiving image data for tracking a plurality of objects;
a control unit including processing logic, the control unit comprising:
a processor configured to identify an object to be selected from the plurality of objects;
a tracking unit configured to determine whether the object has been selected based at least in part on a set of selection criteria, wherein the set of criteria is based at least in part on user's capability in handling the ARD and wherein the user's capability includes developmental state and health condition of the user, wherein the tracking unit is further configured to determine an adjustable degree of stillness of the ARD with respect to the object to be selected, an adjustable time of hold of the ARD with respect to the object to be selected, and an adjustable tolerance of temporary loss of target by the ARD with respect to the object to be selected, based at least in part on the development state and health condition of the user; and
an augmented reality user interface unit configured to cause an augmentation to be rendered with the object if it is determined that the object has been selected.

17. The augmented reality enabled device of claim 16, wherein the tracking unit further comprises 3-dimensional tracking configured to:
determine relative poses of the plurality of objects with respect to the ARD; and
update states of the plurality of objects using the relative poses of the plurality of objects with respect to the ARD, wherein the states of the plurality of objects include relational information of the plurality of objects.

18. The augmented reality enabled device of claim 17, wherein the tracking unit is further configured to:
detect poses of the plurality of objects with respect to previously received image data of the plurality of objects.

19. The augmented reality enabled device of claim 17, wherein the relational information comprises:
relationships among the plurality of objects in a game;
relationships among the plurality of objects in a story;
relationships between the plurality of objects with respect to a background; or some combination thereof.

20. The augmented reality enabled device of claim 16, wherein the processor is further configured to:
analyze the plurality of objects using the image data; and
identify the object being closest to a center of an image represented by the image data.

21. The augmented reality enabled device of claim 16, wherein the processor is further configured to:
cause the plurality of objects in the image data to be rendered on a display of the ARD; and
identify the object that covers most of center pixels of the display of the ARD.

22. The augmented reality enabled device of claim 16, wherein the tracking unit is further configured to:
measure relative velocity between the object and the ARD; and
measure amount of time the object is stationary with respect to the ARD.

23. The augmented reality enabled device of claim 16, wherein the control unit is further configured to:
receive an audio command; and
measure amplitude of the audio command.

24. The augmented reality enabled device of claim 16, wherein the set of selection criteria comprises:
the object being in view of the ARD for a predetermined period of time;
the object being in view of the ARD and a relative velocity between the object and the ARD being below a predetermined threshold;
the object being in view of the ARD and amplitude of an audio command exceeding a predetermined value; or
some combination thereof.

25. The augmented reality enabled device of claim 16, wherein the augmented reality user interface unit is further configured to:
present interactions between the object and the ARD in a display of the ARD.

26. The augmented reality enabled device of claim 16, wherein the processor is further configured to determine that the object has been zoomed in on.

27. The augmented reality enabled device of claim 16, wherein the processor is further configured to:
cause an indicator to be presented, wherein the indicator indicating that the object has been identified; and
determine whether the object is deselected in response to presentation of the indicator.

28. The augmented reality enabled device of claim 27, wherein the processor is further configured to:
determine that the object has been selected if a position of the object with respect to the ARD is maintained for a threshold amount of time after presentation of the indicator.

29. The augmented reality enabled device of claim 27, wherein the indicator comprises:
an icon;
a vibration of the object on a display of the ARD;
a vibration of the ARD when the object is centered on the display of the ARD;
a representation of an elapsed time; or some combination thereof.

30. The augmented reality enabled device of claim 16, wherein the augmented reality user interface unit is further configured to:
cause an image of a scene to be displayed on a display of the ARD, the scene including one or more objects;
cause the image to be augmented with an indicator identifying an object of to be selected from the plurality of objects; and
determine whether the object has been deselected subsequent to the image being augmented with the indicator.

31. A non-transitory medium storing instructions for execution by one or more computer systems, the instructions comprising:
instructions for receiving image data for tracking a plurality of objects;
instructions for identifying an object to be selected from the plurality of objects;
instructions for determining whether the object has been selected based at least in part on a set of selection criteria, wherein the set of criteria is based at least in part on user's capability in handling the ARD and wherein the user's capability includes developmental state and health condition of the user, wherein the instructions for determining whether the object has been selected includes instructions for determining an adjustable degree of stillness of the ARD with respect to the object to be selected, an adjustable time of hold of the ARD with respect to the object to be selected, and an adjustable tolerance of temporary loss of target by the ARD with respect to the object to be selected, based at least in part on the development state and health condition of the user; and instructions for causing an augmentation to be rendered with the object if it is determined that the object has been selected.

32. An apparatus, comprising:

means for receiving image data for tracking a plurality of objects;

means for identifying an object to be selected from the plurality of objects;

means for determining whether the object has been selected based at least in part on a set of selection criteria, wherein the set of criteria is based at least in part on user's capability in handling the ARD and wherein the user's capability includes developmental state and health condition of the user, wherein the means for determining whether the object has been selected includes means for determining an adjustable degree of stillness of the ARD with respect to the object to be selected, an adjustable time of hold of the ARD with respect to the object to be selected, and an adjustable tolerance of temporary loss of target by the ARD with respect to the object to be selected, based at least in part on the development state and health condition of the user; and means for causing an augmentation to be rendered with the object if it is determined that the object has been selected.

33. The apparatus of claim 32, wherein the tracking comprises 3-dimensional tracking comprising:

means for determining relative poses of the plurality of objects with respect to the ARD; and means for updating states of the plurality of objects using the relative poses of the plurality of objects with respect to the ARD, wherein the states of the plurality of objects include relational information of the plurality of objects.

34. The apparatus of claim 32, wherein means for identifying an object to be selected comprises:

means for analyzing the plurality of objects using the image data; and means for identifying the object being closest to a center of an image represented by the image data.

35. The apparatus of claim 32, wherein means for determining whether the object has been selected further comprises:

means for measuring relative velocity between the object and the ARD; and means for measuring amount of time the object is stationary with respect to the ARD.

36. The apparatus of claim 32, wherein instructions for determining whether the object has been selected further comprises:

means for receiving an audio command; and means for measuring amplitude of the audio command.

37. The apparatus of claim 32, wherein the set of selection criteria comprises:

the object being in view of the ARD for a predetermined period of time;

the object being in view of the ARD and a relative velocity between the object and the ARD being below a predetermined threshold;

the object being in view of the ARD and amplitude of an audio command exceeding a predetermined value; or some combination thereof.

38. The apparatus of claim 32, wherein means for causing the augmentation to be rendered comprises:

means for presenting interactions between the object and the ARD in a display of the ARD.

* * * * *